(12) United States Patent  (10) Patent No.: US 7,013,750 B1
Kazami  (45) Date of Patent: Mar. 21, 2006

(54) UNIT SET FOR ROBOT

(75) Inventor: Keiichi Kazami, Tokyo (JP)

(73) Assignee: Bandai Co., LTD, Tokyo (JP)

( * ) Notice: Subject to any disclaimer, the term of this patent is extended or adjusted under 35 U.S.C. 154(b) by 152 days.

(21) Appl. No.: 10/220,027

(22) PCT Filed: Aug. 25, 2000

(86) PCT No.: PCT/JP00/05775

§ 371 (c)(1),
(2), (4) Date: Dec. 17, 2002

(87) PCT Pub. No.: WO02/064077

PCT Pub. Date: Aug. 22, 2002

(30) Foreign Application Priority Data

Feb. 9, 2001 (JP) .................................. 2001-34242
Apr. 27, 2001 (JP) .............................. 2001-132803

(51) Int. Cl.
*B25J 17/00* (2006.01)
(52) U.S. Cl. .................... 74/490.05; 74/490.03; 74/490.06; 901/28; 901/29
(58) Field of Classification Search ............ 74/490.01, 74/490.03, 490.05, 490.06; 901/14, 15, 16, 901/28, 29
See application file for complete search history.

(56) References Cited

U.S. PATENT DOCUMENTS 3,580,099 A * 5/1971 Mosher ........................ 74/469

4,561,816 A * 12/1985 Dingess .................... 74/490.05

(Continued)

FOREIGN PATENT DOCUMENTS

| EP | 0 124 237 A1 | 11/1984 |
|---|---|---|
| JP | A 62-282886 | 12/1987 |
| JP | B2 63-50155 | 10/1988 |
| JP | U 64-8308 | 1/1989 |
| JP | A 10-249755 | 9/1998 |

OTHER PUBLICATIONS

Matsumaru, "Design and Control of the Modular Robots System: TOMMS", May 21-27, 1995, Proceedings of the IEEE International Conference on Robotics and Automation, Nagoya, Japan, pp. 2125-2131.

(Continued)

*Primary Examiner*—David M. Fenstermacher
(74) *Attorney, Agent, or Firm*—Oliff & Berridge, PLC

(57) ABSTRACT

A unit for constructing a robot with units, wherein a joint unit comprises joint means and is organized in a joint casing having a surface profile of a dice-like cube, or a uniaxial cylindrical body, or an orthogonal dual-axis cylinder-like cubic with a uniform joint means separation distance. The joint means comprises N positioning projections disposed about the center axis thereof at equal intervals and equal angles and N connecting screw holes respectively disposed at positions rotated from these projections by 360°/2N about the center axis thereof. Also, a zero-degree joint power transmission unit converts and transmits the rotations of the joint unit rotated, by itself, relative to an input joint fixed shaft fixed to the joint casing, to the rotations of an output rotating shaft disposed a joint unit separation distance away therefrom.

22 Claims, 18 Drawing Sheets

U.S. PATENT DOCUMENTS

| | | | |
|---|---|---|---|
| 4,685,349 A * | 8/1987 | Wada et al. | 74/490.04 |
| 4,724,716 A * | 2/1988 | Kawai | 74/490.05 |
| 4,993,913 A * | 2/1991 | Ohtsuki | 414/729 |
| 5,130,632 A * | 7/1992 | Ezawa et al. | 318/568.11 |
| 5,523,662 A * | 6/1996 | Goldenberg et al. | 318/568.11 |
| 5,672,924 A * | 9/1997 | Wallace et al. | 310/152 |
| 6,084,373 A * | 7/2000 | Goldenberg et al. | 318/568.11 |
| 6,605,914 B1 * | 8/2003 | Yim et al. | 318/568.11 |
| 6,686,717 B1 * | 2/2004 | Khairallah | 318/568.11 |

OTHER PUBLICATIONS

Communication pursuant to Article 96(2) EPC, Application No. 00 944 049 2-2316 (PCT/EP Regional Phase Application corresponding to the present application), dated Mar. 30, 2005.

* cited by examiner

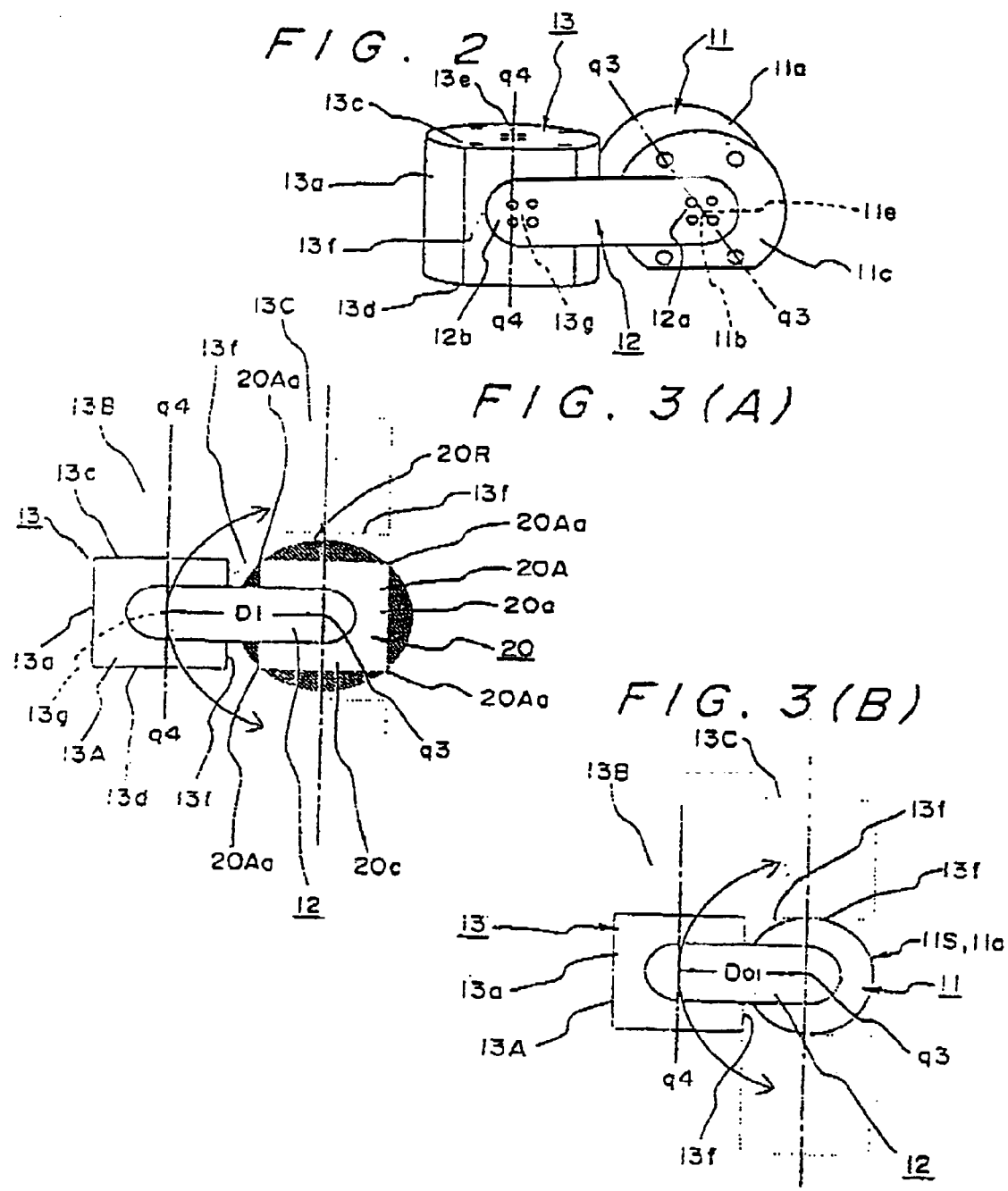

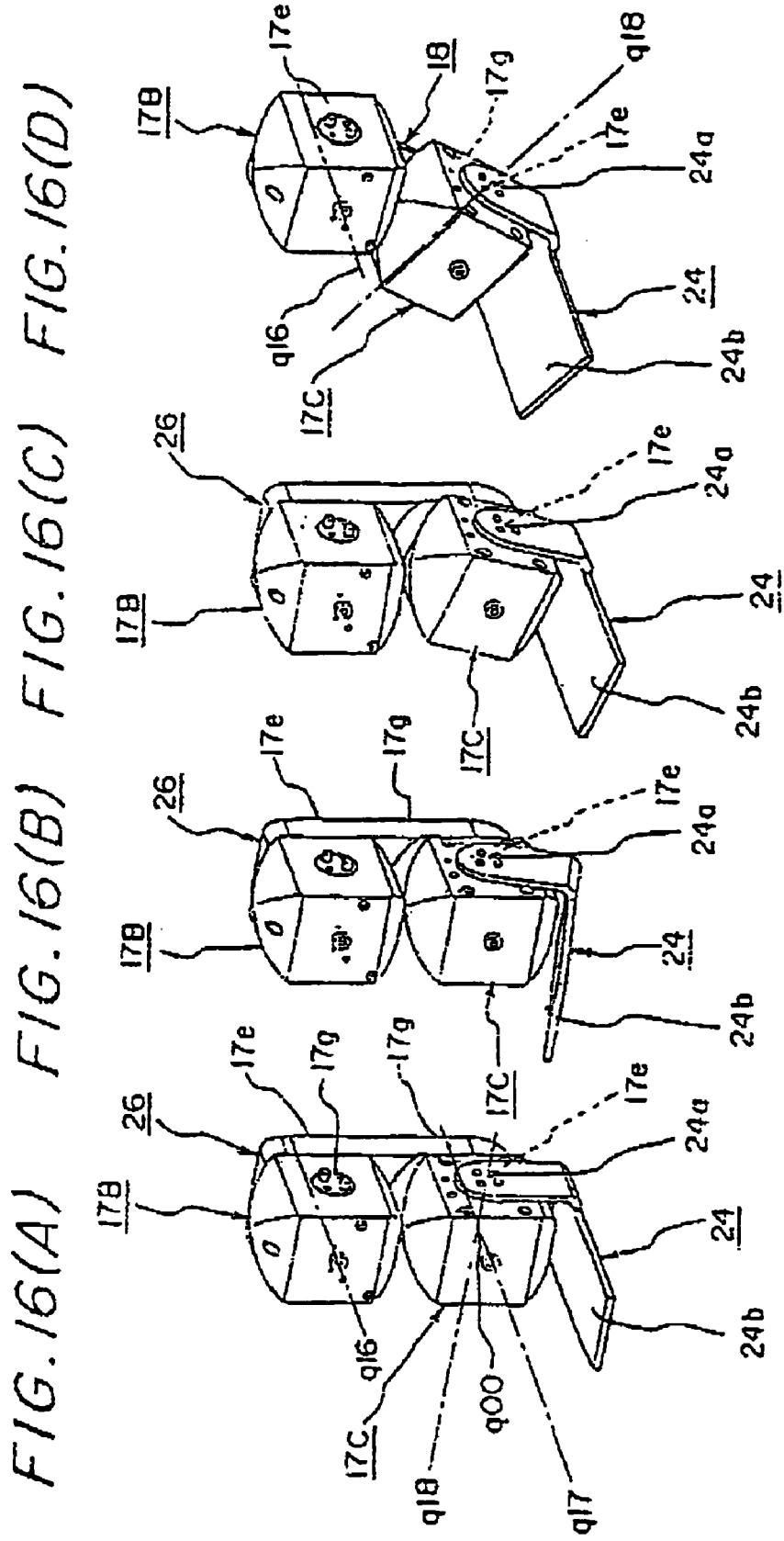

FIG. 22(A)
FIG. 22(B)
FIG. 22(C)
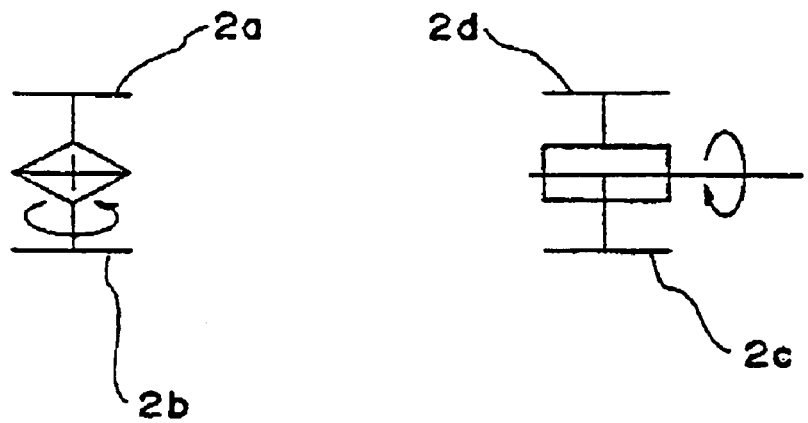
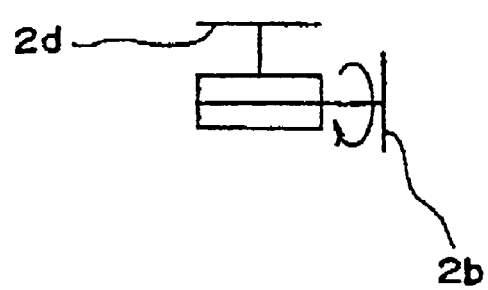
FIG. 23
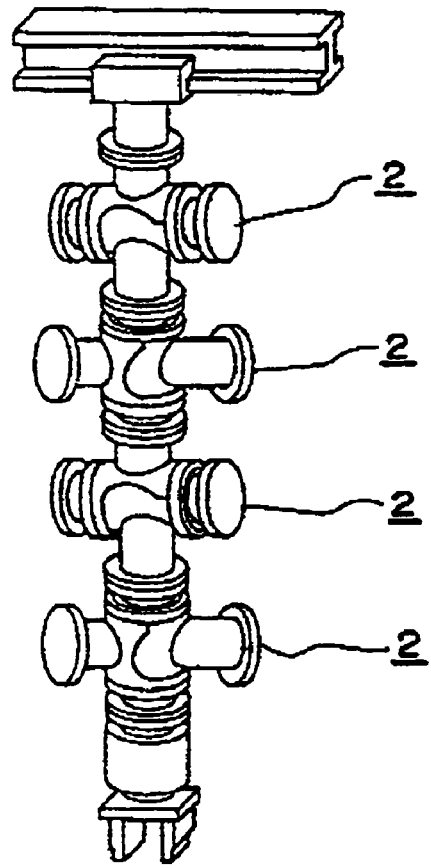

UNIT SET FOR ROBOT

BACKGROUND

The present invention relates to a unit set for a robot, consisting of multiple types of units which are freely connected one with another to configure a robot, and particularly relates to a unit set for a robot including robot joint units for realizing the functions of joints by ensuring rotational driving of a rotating joint means facing outwards by means of a rotation driving means such as a built-in motor or the like, thereby rotationally driving other external components detachably connected to the rotating joint means.

Various types of such robot joint units have already been realized, with one typical example being disclosed in Japanese Examined Patent Application Publication No. 63-50155. According to this typical example, as shown in FIG. 20, a joint unit 1 is configured with an output rotating shaft $1c$ of a motor $1b$ equipped with a reducing device and assembled in an inner casing $1a$, being connected to the inner face of an outer casing $1e$ via a coupling mechanism $1d$, and with an outer casing center portion arm attaching portion $1f$ being fixed on the outer surface of the outer casing $1e$ surrounding the output rotating shaft $1c$ so as to rotate around the output rotating shaft $1c$, wherein the perimeter portion of the outer casing $1e$ encloses the portion of the inner casing $1a$ shown at the lower side in the diagram so as to be relatively rotationally drivable, and wherein an outer casing perimeter portion arm attaching unit $1g$ is fixed on the surface of the outer casing $1e$ which encloses that portion of the inner casing $1a$ at the lower side of the diagram, an inner casing perimeter portion arm attaching unit $1h$ is fixed on the surface of the perimeter portion of the inner casing $1a$ at the upper side of the drawing, and a feedback unit arm attaching portion $1i$ which is uniaxially driven with the output rotating shaft $1c$ is fixed on an end face of the motor $1b$ appearing at the right side in the drawing, the end face being on the opposite side of the output rotating shaft $1c$ face of the motor $1b$. With a conventional joint unit 1 having such a configuration, the outer casing center portion arm attaching portion $1f$ and feedback unit arm attaching portion $1i$ are rotationally driven by the motor $1b$ in the relative relation around a center axis of the output rotating shaft $1c$ indicated as an X axis in the figure, and the outer casing perimeter portion arm attaching portion $1g$ is rotationally driven by the motor $1b$ around the axis of the output rotating shaft $1c$ as one body together with the outer casing $1e$, so as to ensure the advancing and retreating movements with regard to the inner casing perimeter portion arm attaching portion $1h$ fixed on the inner casing $1a$, which portion $1h$ confronts a rotational track of the circumference of the outer casing $1e$ rotating around the axis X, thereby realizing a joint unit connectable in two orthogonal axial directions with uniaxial driving.

A typical example of a joint configuration of this type of joint units is disclosed in Japanese Unexamined Patent Application Publication No. 62-282886. According to this typical example, as shown in FIG. 21, a joint unit 2 which has the same configuration as in the above-described Japanese Examined Patent Application Publication No. 63-50155 comprises a pair of roll flanges $2a$ and $2b$ each corresponding to the outer casing center portion arm attaching portion $1f$ and feedback unit arm attaching portion $1i$, and a pair of pitch flanges $2c$ and $2d$ each corresponding to the outer casing perimeter portion arm attaching portion $1g$ and inner casing perimeter portion arm attaching portion $1h$, configured such that the pair of pitch flanges $2c$ and $2d$ are relatively rotationally driven around the common center axis of the roll flanges $2a$ and $2b$. As for connecting implementations of joint units having such a configuration, a case wherein, as shown in FIG. 22(A), the relative rotational motion between the pair of roll flanges $2a$ and $2b$ is transmitted to an external component, a case wherein, as shown in FIG. 22(B), the rotational motion of the roll flanges $2a$ and $2b$ around the common center axis between the pitch flanges $2c$ and $2d$ is transmitted to an external component, and a case wherein, as shown in FIG. 22(C), the relative rotational motion of the pitch flange $2d$ with regard to the roll flange $2b$ around the common center axis of the roll flanges $2a$ and $2b$ is transmitted to an external component, can be conceived, so that various multi-joint functions can be realized by connecting a plurality of joint units 2 in the form of an arbitrary connecting implementation so as to assemble a multi-joint structure such as shown in FIG. 23. With the conventional joint units of this type, much work is being done in structural improvements directed to the reduction in size. Japanese Unexamined Patent Application Publication No. 10-249755 discloses a typical example of an improved structure. According to this typical example as shown in FIG. 24, a joint unit 3 is configured with a motor $3a$ and multi-stage reducing gear trains $3b$ being stored in a cubic casing $3c$ at high densities, wherein both ends $3e$ and $3f$ of an output rotating shaft $3d$ aligned with the last stage reducing gear respectively pass through both opposing faces of the casing $3c$ to appear outwards, and wherein a potentiometer $3h$ connected to an intermediate stage $3g$ of the gear trains $3b$ is stored in the casing $3c$.

Joint units through which two long arms are connected for being flexible are also used widely, and Japanese Examined Utility Model Registration Application Publication No. 1-8308 discloses working on an improved configuration of such types of joint units aimed at widening an angle of flexion. As shown in FIG. 25, a jointunit 6, which lies between a long first arm 4 and a long second arm 5 so as to connect the arms 4 and 5 in a flexing manner, stores therein: a driving gear $6a$ axially fitted to a driving motor; an intermediate gear $6c$ which is rotatably axially supported by a first axial pin $6b$ erected on the first arm 4 so as to mesh with the driving gear $6a$; a first arm rotating gear $6d$ which rotates upon the axial pin $6b$ as one body together with the intermediate gear $6c$ in the same direction; and a second arm rotating gear $6h$ which is rotatably axially supported by a second axial pin $6e$ erected on the second arm 5, with a second arm rotating teeth $6g$ being formed on the perimeter of the second arm rotating gear $6h$ over a range of 180° so as to mesh with the first arm rotating teeth $6f$ formed on the perimeter of the first arm rotating gear $6d$ over a range of 180° thereupon. According to this improved configuration, upon the driving gear $6a$ being rotationally driven by means of the motor in the counter-clockwise direction in the drawing by the motor, the second arm rotating gear $6h$ rotates in the counter-clockwise direction in the drawing for encompassing the first arm rotating gear $6d$, so as to ensure the orbital motion-like rotational motion whereby the joint unit 6 per se rotates in the counter-clockwise direction in the drawing while the second arm 5 also rotates in the counter-clockwise direction in the drawing due to the rotational motion on its center axis of the second arm rotating gear $6h$ in the counter-clockwise direction in the drawing. This results in the relative rotational angle of the second arm 5 in regard to the first arm 4 being twice that of the joint unit 6, so provided that 180° is selected for a rotational angle of the joint unit 6 per se, the meshing of the first arm rotating teeth $6f$ and the second arm rotating teeth $6g$ allows the relative rotational angle between the first and second arms 4 and 5 to reach 360°, thereby realizing the enlarged angle of flexion in the joint unit 6.

With regard to joint units for robots and robot structures constructed by assembling such joint units on the basis of such background arts, there has been the problem of insufficiencies in the point of the reduction in size by high-density installation of the components in the unit itself, in the point of the increased quality from the aspect of ensuring convenience in the assembling work and ensuring natural rotational motions, and in the point of the diversity of expressible configurations for a robot.

DISCLOSURE OF INVENTION

In light of the above problems of the background art with regard to the reduction in size in the increased quality and diversity, it is an object of the present invention to provide a unit set for a robot, wherein: a surface profile of a joint unit for a robot is arranged so as to be a dice-like cube or a uniaxial cylindrical body or an orthogonal dual-axis cylinder-like cube in which a joint means separation distance is uniform; a joint means is arranged so as to comprise N positioning projections disposed at equally spaced angles around an axis and N connecting screw holes disposed at positions rotated therefrom by 360°/2N around the axis; a rotating driving means such as motors are arranged so as to be plural ones which cooperatively perform driving motions via a single intermediate gear; a single stay for a robot is arranged so as to comprise, on both ends thereof, the N fitting holes capable of fitting to the N positioning projections on the joint means at each rotational position of 360°/2N around the axis, as a joint receiving means; a double stay for a robot is arranged so as to comprise, on both ends thereof, an axially supporting receiving means such as axially supporting holes or the like rotatably fitting to an axially supporting means such as axially supporting pins disposed opposite to the joint means on a casing surface of the joint unit; an L-shaped stay for a robot is arranged so as to comprise the joint receiving means on both ends thereof; a dual-axial joint power transmission unit for a robot is arranged so as to convert and transmit the rotations of an input joint rotating shaft connected to the joint means of the joint unit for a robot fixed to the casing into rotations of an output joint rotating shaft disposed so as to put a joint unit separation distance from the input joint rotating shaft; a zero-degree joint power transmission unit for a robot is arranged so as to convert and transmit the rotations of the joint unit for a robot rotating by itself relatively as to an input joint fixed shaft fixed to the casing into the rotations of the output joint rotating shaft disposed so as to put the joint unit separation distance from the input joint fixed shaft; and a unit set for a robot is configured so as to include the joint unit for a robot, the single stay for a robot, the double stay for a robot, the L-shaped stay for a robot, the dual-axis joint power transmission unit for a robot, and the zero-degree joint power transmission unit for a robot; thereby implementing various types of robot structures ensuring a wide variety of functions and a wide variety of configurations, advantageous is the reduction in size due to the installation at high densities, with a high degree of convenience in the assembly construction work, and advantageous in ensuring natural rotational moving functions shared with those of living creatures.

In one aspect of the present invention, as shown in FIG. 1 and FIG. 11, provided on a joint casing 10a having a surface profile is an output rotating shaft 10b which passes through one of the surfaces of the joint casing 10a together with one axis which orthogonally comes across that surface as a center axis q1 thereof at an arbitrary position of the surface and which appears outwards, a rotational driving means 17p such as a motor is stored in the joint casing 10a and fixed thereto, a reducing means 17s, 17t, 17u, 17v, 17w, and 17x is connected to a driving rotating shaft 17q of the rotational driving means 17p, for reducing a speed of rotations of the driving rotating shaft 17q and transmitting those to the output rotating shaft 10b, a rotating joint means 10e having a center axis in common with the output rotating shaft 10b rotates as one body therewith, a fixed joint means 10g of the same configuration as the rotating joint means 10e has another center axis q2 which orthogonally intersects, at an arbitrary position, a surface 10f which is orthogonal to the surface 10c of the joint casing 10a where the output rotating shaft 10b appears outwards, the center axis q2 intersecting a center axis q1 common to the center axis of the output rotating shaft 10b, the fixed joint means 10g being fixed on the surface 10f, wherein a rotating joint means separation distance d along the center axis q1 from the rotating joint means 10e to the intersection q0 where the other center axis q2 intersects the center axis q1 common to that of the output rotating shaft 10b, and a fixed joint means separation distance d along the center axis q2 from the intersection q0 to the fixed joint means 10g, are selected to be uniform.

As shown in FIG. 2, in one configuration the surface profile of a joint casing 11a of a joint unit 11 is cylindrical, and a center axis q3 of the cylinder is common to that of the output rotating shaft 1e.

As shown in FIG. 4, in another configuration the surface profile of a joint casing 14a of the joint unit 14 is an orthogonal dual-axis cylinder-like cube configured of overlapping enclosing portions of two cylindrical parts, each having an axis of uniform axial length which forms each of orthogonal dual axes of the cylinder-like tubes, wherein a center axis q6 of one cylindrical part of the two cylindrical parts is common to the center axis of the output rotating shaft 14b, and wherein a center axis q5 of the other cylindrical part is common to another center axis which intersects the center axis of the output rotating shaft 14b.

In another aspect, as shown in FIG. 7, a rotating joint means 17e has a center axis q12 common to that of an output rotating shaft 17b, and comprises N positioning projections 17l and 17m disposed about the output rotating shaft 17b at equal intervals on an arbitrary circumference surrounding the center axis q12, and N connecting screw holes 17n and 17o disposed around the output rotating shaft 17b at positions rotated from the N positioning projections 17l and 17m by 360°/2N with regard to the center axis q12 as the center thereof, so as to rotate as one body together with the output rotating shaft 17b, and a fixed joint means 17g has another center axis q11 which orthogonally intersects, at an arbitrary position, a surface 17f which is orthogonal to the surface 17c of the joint casing 17a where the rotating joint means 17e is provided, and is formed in the same configuration as the rotating joint means 7e to be disposed on the joint casing 17a on an arbitrary circumference surrounding the center axis q11, and to be fixed to the joint casing 17a.

As described even more specifically in FIG. 7, in one configuration the rotating joint means 7e and fixed joint means 17g also comprise two positioning projections 17l and 17m and two connecting screw holes 17n and 17o rotated therefrom by 90°.

In a configuration in which the rotating joint means separation distance d and the fixed joint means separation distance d are selected to be uniform, a rotating joint means 17e comprising the N positioning projections 171 and 17m and the N connecting screw holes 17n and 17o, and a fixed joint means 17g having the same configuration are allowed to work in cooperation.

In a configuration in which the rotating joint means separation distance d and the fixed joint means separation distance d are selected to be uniform, a rotating joint means 17e comprising four positioning projections 171 and 17m and four connecting screw holes 17n and 17o, and fixed joint means 17g having the same configuration are allowed to work in cooperation.

In another configuration, the surface profile of a uniaxial cylinder is either a configuration wherein both rotating and fixed joint means separation distances d are selected to be uniform, and the rotating joint means 17e comprising the N positioning projections 171 and 17m and the N connecting screw holes 17n and 17o and a fixed joint means 17g having the same configuration are allowed to work in cooperation, or a the configuration wherein both rotating and fixed joint means separation distances d are selected to be uniform, and the rotating joint means 17e comprising four positioning projections 17l and 17m and four connecting screw holes 17n and 17o, and a fixed joint means 17g having the same configuration are allowed to work in cooperation.

In another configuration, the surface profile of an orthogonal dual-axis cylinder-like cube is either a configuration characterized by both joint means 17e and 17g having N components or a configuration characterized by both joint means 17e and 17g having four components.

In another aspect, as shown in FIG. 10, two or more rotational driving means 17p and 17pp are stored at an inner periphery portion centered on the output rotating shaft 17b in the joint casing 17a and assembled in an attitude for the two or more driving rotating shafts 17q and 17qq to stand parallel to the output rotating shaft 17b, and the reducing means 17t, 17u, 17v, 17w, and 17x, including a plurality of reducing gear trains disposed around the output rotating shaft 17b so as to link the driving gears 17r and 17rr on the driving rotating shafts 17q and 17qq of the respective rotating driving means 17p and 17pp to a slave gear 17x on the output rotating shaft 17b, thereby reducing a speed of rotations of the driving rotating shafts 17q and 17qq and transmitting those to the output rotating shaft 17b, and particularly, in one configuration, a single tooth row of an intermediate gear 17s meshes with the respective gears 17r and 17rr on the two or more rotating driving means 17p and 17pp to allow the intermediate gear 17s to rotate on a center axis q12 of the output rotating shaft 17b so as to transmit the rotations of the driving gears 17q and 17qq to the reducing gear trains 17t, 17u, 17v, 17w, and 17x.

In another configuration, the surface profile of the uniaxial cylinder is either a configuration characterized by a multiple rotating driving means 17p and 17pp, or a configuration characterized by an intermediate gear 17s.

In another configuration, the surface profile of an orthogonal dual-axis cylinder-like cube is either a configuration characterized by multiple rotating driving means 17p and 17pp, or a configuration characterized by an intermediate gear 17s.

As shown in FIG. 1, in another configuration, a joint unit fixing means 19a, 19b, 19c, and 19d is fixed on one surface 10c of the joint casing 10a through which the output rotating shaft 10b passes through, with regard to a configuration characterized by multiple rotating driving means 17p and 17pp, so as to be capable of fixing itself to other units such as a dual-axis joint power transmission unit, and in another configuration, a double stay axial-supporting means 21a for a rotating joint is fixed on the surface 10d confronting the surface 10c of the joint casing 10a where the rotating joint means 10e is arranged at a position through which the center axis q1 of the rotating joint means 10e passes, and appears outwards, and a double stay axial-supporting means 21b for a fixing joint is fixed on the surface 10h confronting the surface 10f where the fixed joint means 10g is arranged, at a position through which the center axis q2 of the fixed joint means 10g passes, and appears outwards. Accordingly, the double stay 23 shown as an example in FIG. 13 is rotatably axially supported on one of the separate stay axially supporting means 21a and 21b as to the joint casing 10.

In another aspect, as shown in FIGS. 7, 13(A) and 13(B), a single stay 22 has on both ends thereof the joint receiving means 22a and 22b so as to be detachably connected to the rotating joint means 17e or the fixed joint means 17g of the joint casing 17a, and particularly, in one configuration, each joint receiving means 22a and 22b comprises at the end of the single stay 22, 2N fitting holes 18a1, 18a2, 18a3, and 18a4, which align with and fit to the respective N positioning projections 171 and 17m on the joint means 17e or 17g of the joint casing 17a at each position rotated by 360°/2N around the center axes q11 or q12 of the joint means 17e or 17g as the center thereof, and wherein N fitting holes other than the N fitting holes aligned with and fitted to the N positioning projections 171 and 17m are aligned with N connecting screw holes 17n and 17o of the joint means 17e or 17g, and arranged so as to allow the single stay 22 to be fastened to the joint means 17e, 17g by screwing a bolt at least into one fitting hole.

In another aspect, as shown in FIGS. 14(A) and 14(B), an L-shaped stay 25 formed of a long L-shaped rigid member has on both ends thereof a joint receiving means 25a and 25b so as to be detachably connected to the joint means 17e or 17g of the joint casing 17a, and particularly, in one configuration the joint receiving means comprising four fitting holes.

As shown in FIG. 14(B), in one configuration the separation distance between the center axis q13 of the joint means 17e or 17g connected to the joint receiving means 25a provided on one end 25A of both ends 25A and 25B of the L-shaped stay 25 and the other end 25B, is selected so as to be equal to the joint means separation distance d shown in FIG. 1, whereby one joint unit 17D in a rotational motion ensures the natural rotational movement around the common center axis q13 relative to another joint unit 17E in a stationary state.

As shown in FIGS. 14(A) and 14(B), in one configuration the joint receiving means 25a comprising N fitting holes is conditional to the joint receiving means 25a provided on both ends 25A and 25B of the L-shaped stay.

In another aspect, as shown in FIG. 15, an input joint rotating shaft 26b rotatably axially supported by one end of a long plate-shaped cubic casing 26a is rotationally driven by the rotating joint means 17e of a joint unit 17B detachably connected by means of the input joint rotating shaft connecting means 26b1 provided on the input joint rotating shaft 26b, a joint rotation converting means 26c, 26d, and 26e converts the rotations of the input joint rotating shaft 26b into those at a predetermined rotating speed and in a predetermined rotating direction and transmits those to an output rotating shaft 26f rotatably axially supported at the other end portion of the casing 26a at a position a predetermined joint unit separation distance in the longitudinal direction of the casing 26a from the input joint rotating shaft 26b, so that another joint unit 17C detachably connected with the fixed joint means 17g via output joint rotating shaft connecting means 26 and 26f1 performs the rotational motion, and accordingly, as shown in FIGS. 16(A)–16(D), the rotations of the rotating joint means 17e of the joint unit 17B around the center axis q16 which has no intersecting point on the center axis q18 of the rotating joint means 17e of the joint unit 17C are converted into the rotations of the output joint rotating shaft 17f around the center axis q17 which has an intersecting point on the center axis q18, and further, those of the joint unit 17C, thereby ensuring the rolling and pitching actions for the joint unit 17C on the two orthogonal axes q17 and q18, and particularly, in one configuration the joint unit separation distance is designed for being twice the joint means separation distance to reach the minimum joint unit separation distance Do2, and also particularly, in one configuration the joint rotation converting means 26c, 26d, and 26e converts the rotations of the input joint rotating shaft 26b into the rotations at the same speed and in the same direction as those of the input joint rotating shaft 26b, and transmit those to the output rotating shaft 26f.

In another aspect, as shown in FIG. 17, an input joint fixed shaft 27b fixed on one end of a long plate-shaped cubic casing 27a, and the rotating joint means 17e of the joint unit 17B detachably connected by means of the input joint fixed shaft connecting means 27b1 provided on the input joint fixed shaft 27b are relatively rotationally driven with regard to the joint casing connecting means 28 detachably connected to the joint unit fixing means 19a, 19b, 19c, and 19d of the joint casing 17a, the external teeth of an annular driving gear 28e of the joint casing connecting means 28 rotatably inserted into the surrounding space of the input joint fixed shaft 27b relatively rotate with regard to the input joint fixed shaft 27b, a rotation inversion converting means 27c, 27d, and 27f converts these relative rotations into the rotations at a predetermined speed and in a reversed direction, and transmit those to an output joint rotating shaft 27f rotationally axially supported at the other end of the casing 27a at a position a predetermined joint unit separation distance in the longitudinal direction of the casing 27a from the input joint fixed shaft 27b, so that the other joint unit 17C detachably connected to the output joint rotating shaft 27f via output joint rotating shaft connecting means 27f and 27f1 ensures the rotational motion, and accordingly, the 180° counter-clockwise orbital motion-like rotational motion of the rotating joint means 17e on the joint unit 17B around the center axis q19 of the input joint fixed shaft 27b, is accompanied by the 180° counter-clockwise rotational motion of the other joint unit 17C around the center axis q20 of the output joint rotating shaft 27f to ensure, ultimately the 360° (0°) counter-clockwise rotation of the other joint unit 17C, on the basis of the reference angular position of the rotating joint means 17e of the joint unit 17B, and particularly, in one configuration the joint means separation distance is designed for being twice the joint means separation distance d to reach the minimum joint unit separation distance Do2.

In another aspect, as shown in FIG. 19, a unit set for a robot comprises joint units 17A, 17B, and 17C, a single stay 22, a double stay 23, an L-shaped stay 25, a dual-axis joint power transmission unit 26, and a zero-degree joint power transmission unit 27.

BRIEF DESCRIPTION OF THE DRAWINGS

FIG. 1 through FIG. 6 relate to a first aspect of the invention;

FIG. 1 is a perspective view of a cubic joint unit;

FIG. 2 is a perspective view of a uniaxial cylindrical body joint unit;

FIG. 3(A) is an explanatory diagram of the rotational motion of a cubic joint unit;

FIG. 3(B) is an explanatory diagram of the rotational motion of a uniaxial cylindrical body joint unit;

FIG. 4 is a perspective view of an orthogonal dual-axis cylinder-like cube joint unit;

FIG. 7 is a perspective view of a rotating joint means and fixed joint means of a joint unit;

FIG. 8(A) through FIG. 8(D) are perspective explanatory diagrams of the connecting state between a rotating joint means of a joint unit and a rotating joint receiving means of a connecting bar;

FIG. 9(A) is a top cross-sectional view of a joint unit;

FIG. 9(B) is a side cross-sectional view of a joint unit;

FIG. 10 is a perspective view inside the joint unit;

FIG. 11 is a perspective view of the essential components inside the joint unit;

FIG. 12 is a perspective view of inside the joint unit in the case of a single motor;

FIGS. 15(A), 15(B) and 16(A)–16(D) relate to a fifth aspect of the invention;

FIG. 15(A) is a disassembled perspective view of a dual-axis joint power transmission unit;

FIG. 15(B) is a perspective view of a dual-axis joint power transmission unit;

FIG. 16(A) through FIG. 16(C) are perspective explanatory diagrams of the rotational motion in the event of using a dual-axis joint power transmission unit;

FIG. 16(D) is a perspective explanatory diagram of the rotational motion in the event of using a connecting bar;

FIG. 17(A) is a disassembled perspective view of a zero-degree joint power transmission unit;

FIG. 17(B) is a perspective view of a zero-degree joint power transmission unit;

FIGS. 18(A) and 18(B) are the perspective explanatory diagrams of the rotational motion in the event of using a zero-degree joint power transmission unit;

FIGS. 18(C) and 18(D) are perspective explanatory diagrams of the rotational motion in the event of using a connecting bar;

FIGS. 22(A) through 22(C) are schematic diagrams illustrating relative rotational motion between a pair of roll flanges and a pair of pitch flanges of a conventional joint unit;

FIG. 23 is a perspective view of a multi-joint structure utilizing conventional joint units;

DETAILED DESCRIPTION OF THE PREFERRED EMBODIMENTS

Figure 1:
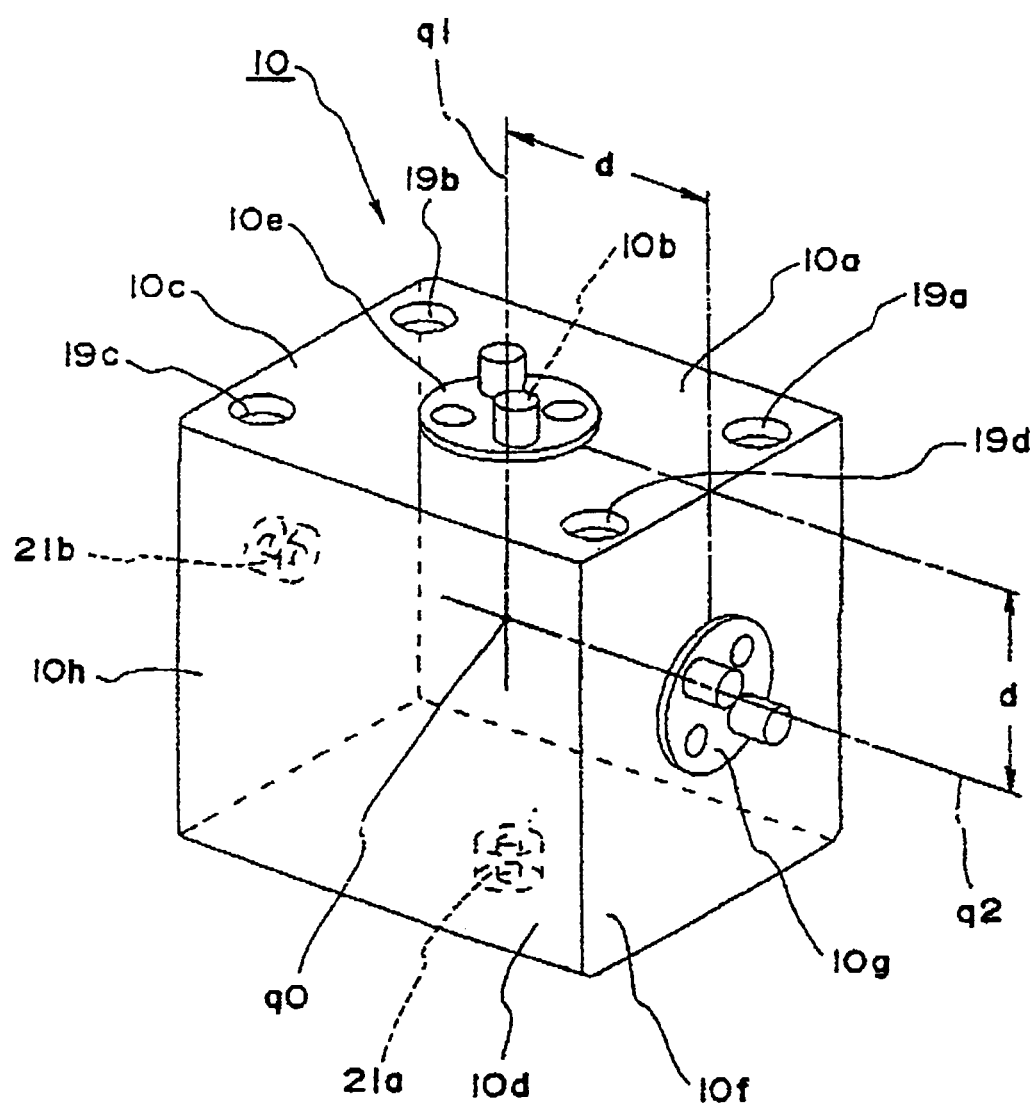

A best mode for carrying out a first aspect of the present invention will be described with reference to FIGS. 1, 2, 3(A), 3(B), 4, 5(A), 5(B), 6(A) and 6(B). As shown in FIG. 1, an output rotating shaft 10b is rotationally driven with rotations of a driving rotating shaft of rotating driving means such as a motor or the like encapsulated within a cubic joint casing 10a having a die-like external appearance and fixed thereto. The aforesaid rotations are transmitted via reducing means such as a gear train or the like. The output rotating shaft 10b has as a center axis q1 thereof, an axis of which is orthogonal to a pair of opposing surfaces 10c and 10d at an arbitrary position on a surface profile of the joint casing 10a, passing through one surface 10c of the casing and extending outwards, and an output rotating shaft is provided with a rotating joint means 10e for relatively rotating as to the surface 10c of the joint casing 10a by rotating as one body therewith.

A fixed joint means 10g having another center axis q2 intersecting the center axis q1 shared with the output rotating shaft 10b is provided on a surface 10f of a pair of opposing surfaces 10f and 10h, orthogonal to the surface 10c of the joint casing 10a from which the output rotating shaft 10b extends outwards, orthogonal thereto at an arbitrary position on this surface 10c. The aforesaid fixed joint means 10g has the same configuration as the rotating joint means 10e and is fixed on one surface 10f of the joint casing 10a so as to be non-rotational. Defining an intersection q0 of the center axis q1 shared with the output rotating shaft 10b and the other center axis q2, a rotating joint means separation distance d from the intersection q0 to the rotating joint means 10e along the center axis q 1, and the fixed joint means separation distance d from the intersection q0 to the fixed joint means 10g along the other center axis q2, are selected so as to be uniform.

Figure 4:
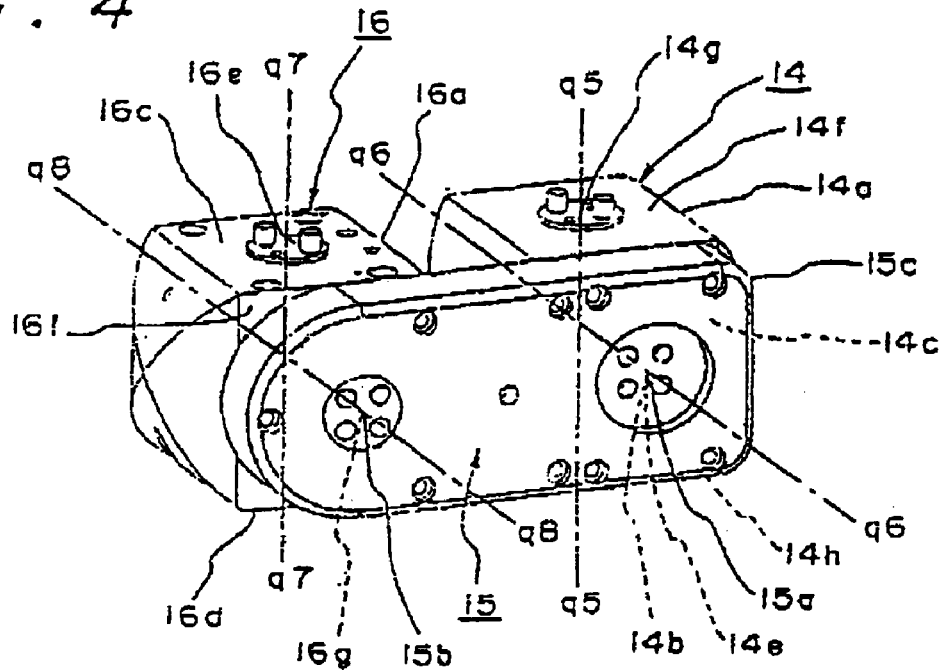
Figure 5A:
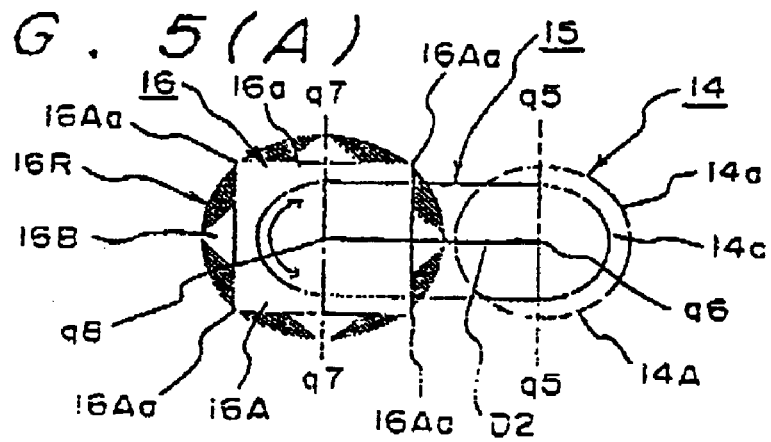
FIG. 5(A) is an explanatory diagram of the rotational motion of a uniaxial cylindrical body joint unit.
Figure 5B:
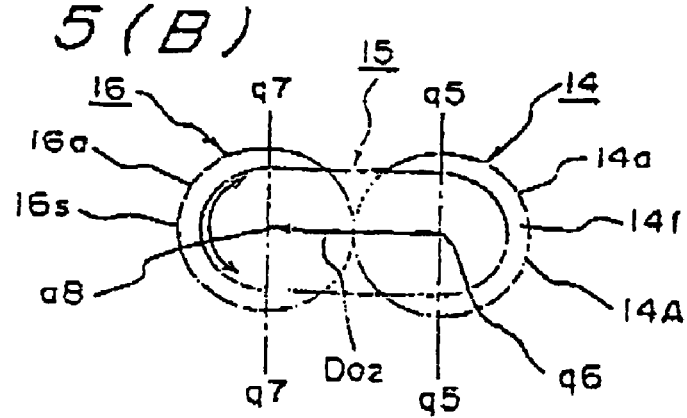
FIG. 5(B) is an explanatory diagram of the rotational motion of an orthogonal dual-axis cylinder-like cube.
Figure 6A:
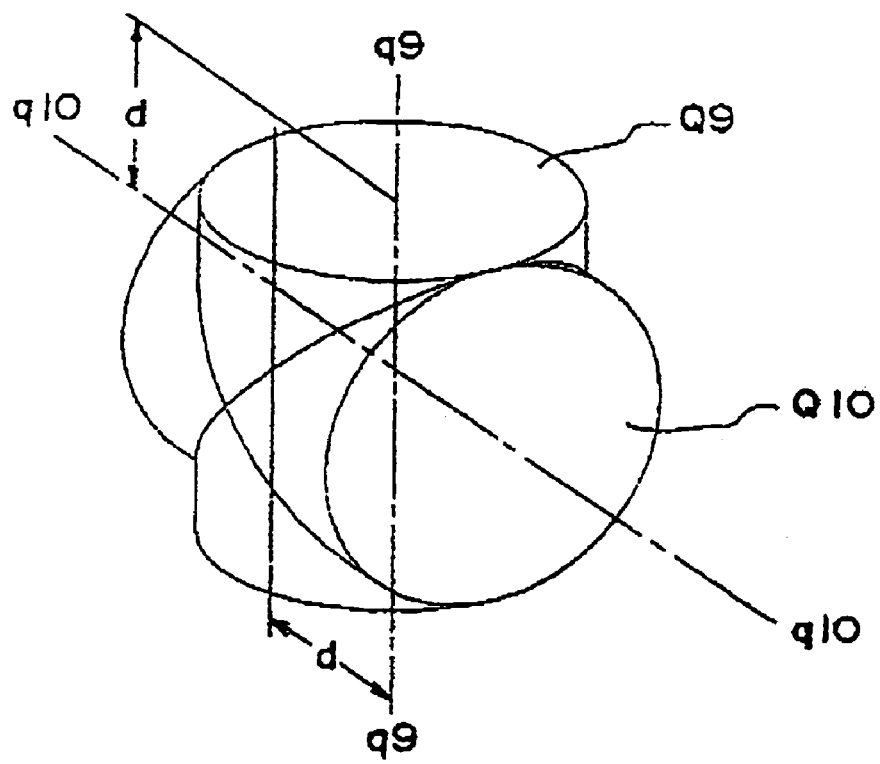
FIG. 6(A) is a perspective explanatory diagram of an orthogonal dual-axis cylindrical member.
Figure 6B:
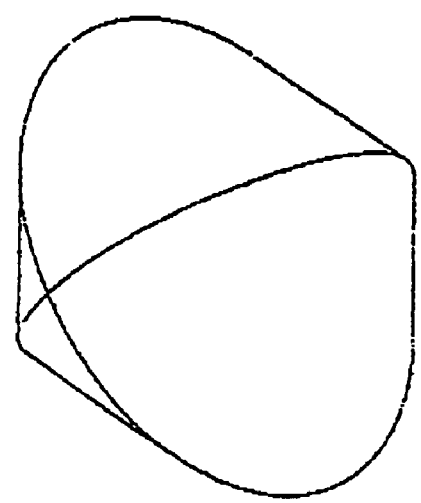
FIG. 6(B) is a perspective view of a surface profile of an orthogonal dual-axis cylinder-like cube formed of an overlapping enclosing member of two cylindrical member parts of an orthogonal dual-axis cylindrical member.

In the embodiment shown in FIG. 2, a joint unit 11 is organized within a joint casing 1a of a uniaxial cylindrical body having a center axis q3, with an output rotating shaft 11b having a center axis shared with the center axis q3 extending outwards on one end face 11c of the uniaxial cylindrical body, and with a rotating joint means 11e being provided on the output rotating shaft 11b. A rotating joint receiving means 12a provided on one end of a connecting bar 12 is detachably connected to the rotating joint means 11e. On the other hand, at a joint casing 13a of the other joint unit 13, a fixed joint means 13g of the same configuration as the rotating joint means 1e is fixed on the perimeter surface 13f of the uniaxial cylindrical body orthogonal to one end face 13c of the uniaxial cylindrical body upon which a rotating joint means 13e is provided, and the other end face 13d thereof faces this. A fixed joint receiving means 12b provided on the other end of the connecting bar 12 is detachably connected to the fixed joint means 13g of the joint unit 13. Upon the rotating joint means 1e of the joint unit 11 being rotationally driven by the output rotating shaft 11b, the connecting bar 12 itself performs rotating motion around the center axis q3 of the output rotating shaft 11b by means of the rotating joint receiving means 12a of the connecting bar 12 rotating around the center axis q3 of the output rotating shaft 11b, whereby the entire joint unit 13 comprising the other uniaxial cylindrical body connected to the connecting bar 12 via the fixed joint receiving means 12b and the fixed joint means 13g performs rotating motion around the center axis q3 of the output rotating shaft 11b of the joint unit 11 while maintaining an attitude wherein the center axis q4 of the output rotating shaft of the joint unit 13 is orthogonal to the center axis q3 of the uniaxial cylindrical body of the joint unit 11. In this case, as shown in FIG. 3(A), the plan tracing shape of the perimeter surface 13f on the fixed joint means 13g side of the joint casing 13a which performs rotational motion appears to be a square 13A, and the square 13A moves as indicated by squares 13B, 13C, . . . , for example, as the connecting bar 12 rotating around the center axis q3, so that a cylindrical space 20R is formed so as to be enclosed by the rotational track of the perimeter surface 13f of the uniaxial cylindrical body of the joint casing 13a equivalent to one side facing the rotating center axis q3 of the series of squares 13B, 13C, . . . . On the other hand, assuming that the plan tracing shape of the end face 11c at the rotating joint means 11e side of the joint casing 11a which does not perform the rotational motion appears to be a square 20A and that the square 20A is equivalent to each of the squares 13A, 13B, 13C, . . . , with reference to the joint casing 13a which performs the rotational motion, the four arrises parallel to the center axis q3 of the cube of the joint casing 11a which does not perform the rotational motion appear as the four corners 20Aa of the square 20A in FIG. 3(A) and inscribe the cylindrical space 20R formed here. Accordingly, with reference to the hatched portions in the cylindrical space 20R shown in FIG. 3(A) as spaces outside of the cube of the joint casing 1a which does not perform the rotational motion, it can be said that there are spaces which are non-productively left outside of the fixed joint casing 11a in view of avoiding mutual interference between the fixed cubic joint casing 11a and the joint casing 13a with the uniaxial cylindrical body which performs the rotational motion thereto, on the rotating track thereof. Conversely, FIG. 3(B) shows the plan tracing shape equivalent to FIG. 3(A) in the event that both the joint casing 11a which does not perform rotational motion and the joint casing 13a which performs rotational motion are organized on a uniaxial cylindrical body, as shown in FIG. 2. In a configuration in FIG. 3(B), a cylindrical space formed by being enclosed by the rotational track of the perimeter surface 13f portion of the uniaxial cylindrical body of the joint casing 13a is made to be asymptotic as to a circle 11S which is a plan tracing of the end face 11c on the rotating joint means 1e side with respect to the uniaxial cylindrical body of the joint casing 11a which does not perform rotational motion, whereby the spaces which are non-productively left outside of the joint casing 11a, such as the hatched portions in FIG. 3(A), can be eliminated. Now, to make the cylindrical space formed by the rotational track of the perimeter surface 13f portion of the joint casing 13a to be asymptotic as to the cylindrical body of the joint casing 11a, means that the joint unit separation distance in FIG. 3(B) corresponding to the joint unit separation distance D1 between the position of the center axis q3 on the output rotating shaft 11b of the joint casing 11a of the cube which is fixed in FIG. 3(A), and the position of the center axis q4 on the output rotating shaft of the joint casing 13a of the other cylindrical body corresponding to the projected position of the fixed joint means 13g of the casing 13a as to the perimeter surface 13f, is minimized to a minimum joint unit separation distance D01. Next, with the embodiment shown in FIG. 4, a joint unit 14 is organized within a joint casing 14a of a orthogonal dual-axis cylindrical body comprising two orthogonal center axes q5 and q6, wherein a fixed joint means 14g having a center axis shared with the center axis q5 is provided on one end face 14f of the orthogonal dual-axis cylindrical body so as to face outwards. A rotating joint means 14e having the same configuration as the fixed joint means 14g is fixed centering the center axis q6 on an end face 14c on the perimeter surface of one of the cylindrical bodies of the orthogonal dual-axis cylindrical body having a center axis q6 parallel to one end face 14f and the opposing end face 14h, around the center axis q6. A rotating joint receiving means 15a provided on one end of a dual-axis coupling unit 15 is detachably connected to the rotating joint means 14e, with the casing 14a of the joint unit 14 being fixed to the casing 15c of the dual-axis coupling unit 15. On the other hand, at the joint casing 16a of the orthogonal dual-axis cylindrical body of the other joint unit 16, a fixed joint means 16g having the same configuration as the rotating joint means 16e is fixed centering an axis q8 on an end face 16f on the perimeter surface of one of the cylindrical bodies of the orthogonal dual-axis cylindrical body having the center axis q8 parallel to one end face 16c of the orthogonal dual-axis cylindrical body where the rotating joint means 16e having a center axis shared with a center axis q7 is provided and to the opposing end face 16d, with a fixed joint receiving means 15b axially supported so as to be relatively rotational as to the casing 15c of the dual-axis coupling unit 15, being detachably connected to the fixed joint means 16g. The rotating joint receiving means 15a of the dual-axis coupling unit 15 relatively rotates as to the casing 15c around the center axis q6, and the fixed joint receiving means 15b of the coupling unit 15 being rotationally driven in a synchronous manner, so that the joint unit 16 rotationally moves around the center axis q8 in the relative relation between the coupling unit 15 and the joint unit 14 fixed thereto. In this case, assuming that, as shown in FIG. 5(A), the plan tracing shape of the end face 16f of the fixed joint means 16g side of the joint casing 16a which performs the rotational motion, appears to be a square 16A as with the example of the uniaxial cylindrical body in the configuration shown in FIG. 2, and the plan tracing shape of the end face 14c of the rotating joint means 14e side of the joint casing 14a which does not perform the rotational motion, appears to be similarly a square 16A as with the example of the uniaxial cylindrical body in the configuration shown in FIG. 2, a square 16A moves as indicated by the squares 16A, 16B, . . . , for example, following the rotations around the center axis q8, so that a cylindrical space 16R is formed, enclosed by the rotating track of the four arrises parallel to the center axis q8 of the fixed joint means 16g orthogonal to the center axis q7 of the uniaxial cylindrical body of the joint casing 16a shown in FIG. 5(A) as the four corner portions 16Aa of the square 16A. This means that the squares 16A, 16B, . . . , which are the plan tracing shapes of the end face 16f of the fixed joint means 16g side of the joint casing 16a which rotates, are inscribed as to the cylindrical space 16R. Accordingly, with regard to the hatched portions in the cylindrical space 16R shown in FIG. 5(A), it can be said that these are spaces which are non-productively left outside of the casing 16a in view of avoiding mutual interference between the squares 16A, 16B, . . . , of the plan tracing shapes of the end face 16f of the joint casing 16a, and the circle 14A of the plan tracing shape of the end face 14c of the joint casing 14a which does not perform the rotational motion upon the rotational moving of the uniaxial cylindrical body of the joint casing 16a. Conversely, FIG. 5(B) shows the plan tracing shape equivalent to FIG. 5(A) in the event that both the joint casing 14a which does not perform the rotational motion and the joint casing 16a which performs the rotational motion are organized on an orthogonal dual-axial cylindrical body, as shown in FIG. 4. In a configuration in FIG. 5(B), the cylindrical space 16R in FIG. 5(A) formed by being enclosed by the rotational track of the four arrises parallel to the center axis q8 of the uniaxial cylindrical body of the joint casing 16a which performs the rotational motion is made to be asymptotic as to a circle 16S which is a plan view of the end face 16f of the fixed joint means 16g side of the cylindrical body having one of the axes of the orthogonal dual-axis cylindrical body of the joint casing 16a, whereby the spaces which are non-productively left outside of the joint casing 16a, such as the hatched portions in FIG. 5(A), can be eliminated. Now, to make the cylindrical space 16R to be asymptotic as to the cylindrical space 16S, means that the joint unit separation distance in FIG. 5(B) corresponding to the joint unit separation distance D2 between the position of the center axis q8 on the output rotating shaft of the joint casing 16a of the uniaxial cylindrical body in FIG. 5(A), and the position of the center axis q6 of the joint casing 14a of the other uniaxial cylindrical body is minimized to a minimum joint unit separation distance Do2. FIG. 6(A) is a perspective view extracting and illustrating the cylindrical bodies having orthogonal dual axes, wherein a cylindrical body Q9 portion having one center axis q9, and another cylindrical body Q10 portion having one center axis q10 which orthogonally intersects the center axis q9 are combined. FIG. 6(B) is a perspective view wherein a closed surface configured by connecting the surface profile of an orthogonal dual-axis cylinder-like cube formed on the overlapping enclosing portions of the two cylindrical body Q9 and Q10 portions is extracted and shown, and is an example of the surface configuration of the joint casings 14a and 16a of the two joint units 14 and 16 shown in FIG. 4.

A best mode for carrying out the invention described in claims 4 through 9 as a second aspect of the present invention will be described with reference to FIGS. 7 and 8(A)–8(D). An output rotating shaft 17b extends outward from one end face 17c of a joint casing 17a of a joint unit 17, with a rotating joint means 17e being provided on the output rotating shaft 17b, and the rotating joint means 17e being axially supported by a bearing 17k so as to be rotatable relative to one end face 17c. The rotating joint means 17e comprises two positioning projections 17l and 17m disposed around the output rotating shaft 17b in an axially symmetrical manner as to the center axis q12 of the output rotating shaft 17b, and two connecting screw holes 17n and 17o disposed around the output rotating shaft 17b at positions wherein the positions of the two aforesaid positioning projections 17l and 17m are rotated by 90° around the same center axis q12 as the center thereof. A rotating joint receiving means 18a for connecting to the rotating joint means 17e is provided on one end of a connecting bar 18, and the connecting bar 18 is detachably assembled to the joint casing 17a in an attitude of different relative angles in increments of 90° around the center axis q12 of the output rotating shaft 17b by connecting with the rotating joint means 17e on the rotating joint receiving means 18a. Here, the rotating joint receiving means 18a comprises four fitting holes 18a1, 18a2, 18a3, and 18a4, disposed at the center portion of one end of the connecting bar 18 around the center axis q13 orthogonal to the connecting bar, at 90° angle intervals. In the event of assembling the connecting bar 18 to the joint casing 17a, positioning such that the center axis q13 of the rotating joint receiving means 18a on the connecting bar 18 and the center axis q12 of the rotating joint means 17e on the joint casing 17 are aligned enables one pair of fitting holes 18a1 and 18a3 at an opposing position, of the four fitting holes 18a1, 18a2, 18a3, and 18a4 serving as rotating joint receiving means 18a, to be fitted with one pair of positioning projections 17l and 17m serving as the rotating joint means 17e at opposing positions, so that the other pair of fitting holes 18a2 and 18a4 at opposing positions, of the four fitting holes and the pair of connecting screw holes 17n and 17o at opposing positions serving as the rotating joint means 17e, can be screwed together by connecting screws 18a5 and 18a6 that are handled separately. In order to set the attitude of the connecting bar 18 at the time of assembly at relative angles in increments of 90° as to the joint casing 17a, the two positioning projections 17l and 17m of the rotating joint means 17e may be separately fitted to the two fitting holes 18a1 and 18a3 of the rotating joint receiving means 18a with the two connecting screw holes 17n and 17o of the rotating joint means 17e being separately aligned to the two fitting holes 18a2 and 18a4 of the rotating joint receiving means 18a and screwed together with the connecting screws 18a5 and 18a6 such as shown in FIG. 8(A), or the two positioning projections 17l and 17m of the rotating joint means 17e may be separately fitted to the two fitting holes 18a4 and 18a2 of the rotating joint receiving means 18a with the two connecting screw holes 17n and 17o of the rotating joint means 17e being separately aligned to the two fitting holes 18a1 and 18a3 of the rotating joint receiving means 18a and screwed together with the connecting screws 18a5 and 18a6 such as shown in FIG. 8(B), or the two positioning projections 17l and 17m of the rotating joint means 17e may be separately fitted to the two fitting holes 18a3 and 18a1 of the rotating joint receiving means 18a with the two connecting screw holes 17n and 17o of the rotating joint means 17e being separately aligned to the two fitting holes 18a4 and 18a2 of the rotating joint receiving means 18a and screwed together with the connecting screws 18a5 and 18a6 such as shown in FIG. 8(C), or the two positioning projections 17l and 17m of the rotating joint means 17e may be separately fitted to the two fitting holes 18a2 and 18a4 of the rotating joint receiving means 18a with the two connecting screw holes 17n and 17o of the rotating joint means 17e being separately aligned to the two fitting holes 18a3 and 18a1 of the rotating joint receiving means 18a and screwed together with the connecting screws 18a5 and 18a6 such as shown in FIG. 8(D). The above description has been made with regard to the connection of the rotating joint means 17e of the joint unit 17 and the rotating joint receiving means 18a of the connecting bar 18 shown in FIG. 7; it is, however, needless to say that this holds with regard to connection between the fixed joint means 17g provided on the end face 17f having the other center axis q11 orthogonal to the center axis q12 of the rotating joint means 17e and the fixed joint receiving means 18b of the connecting bar 18 (or the rotating joint receiving means 18a of the same configuration).

Figure 7:
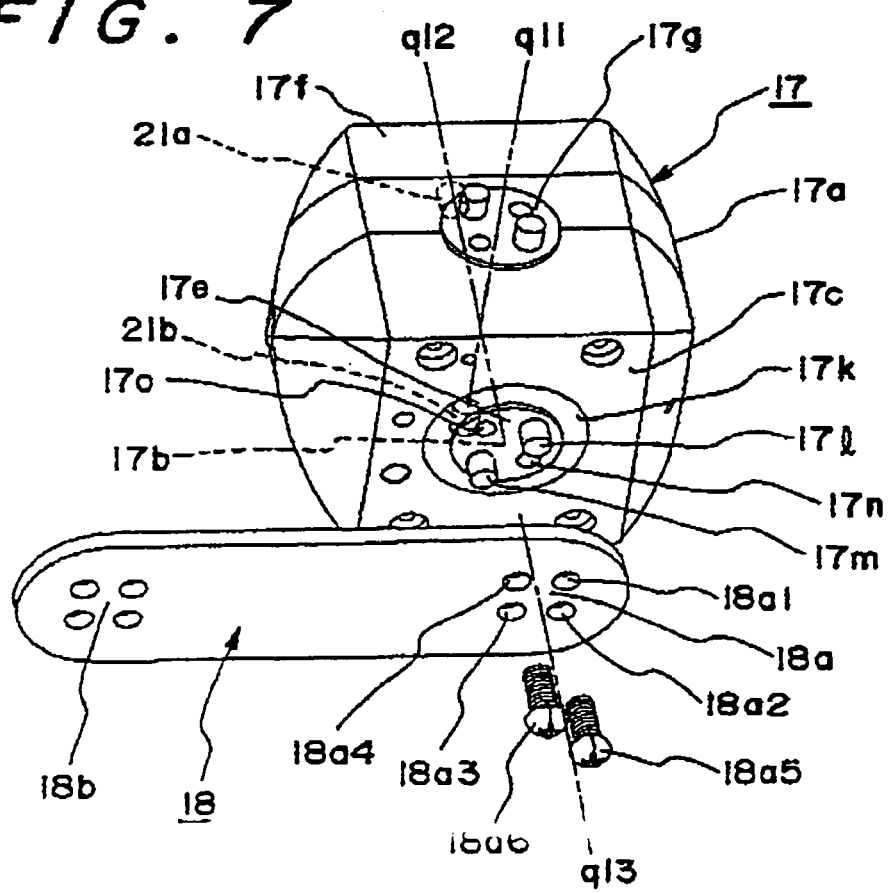
FIG. 7 and FIGS. 8(A)–8(D) relate to a second aspect of the invention.
Figure 8A:
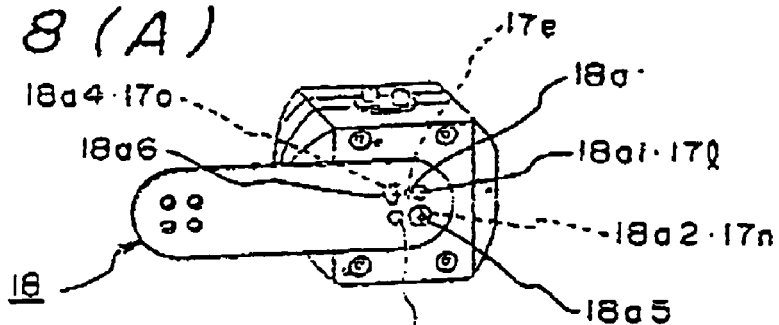
Figure 8B:
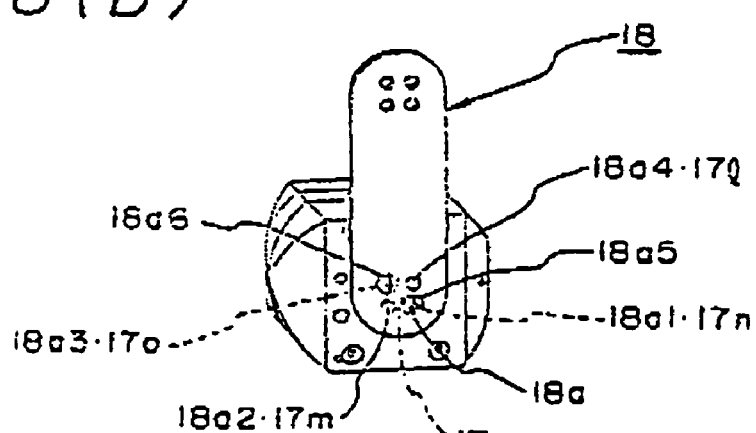
Figure 8C:
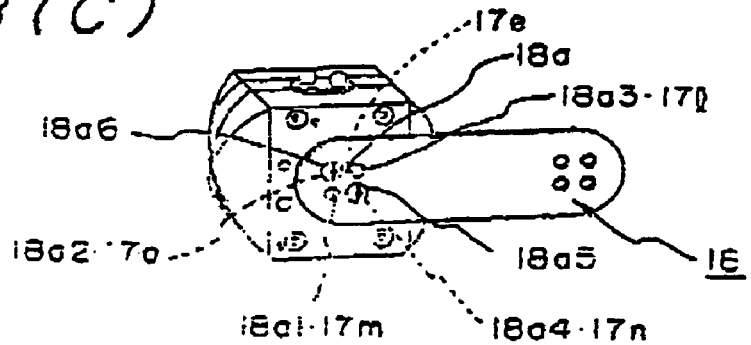
Figure 8D:
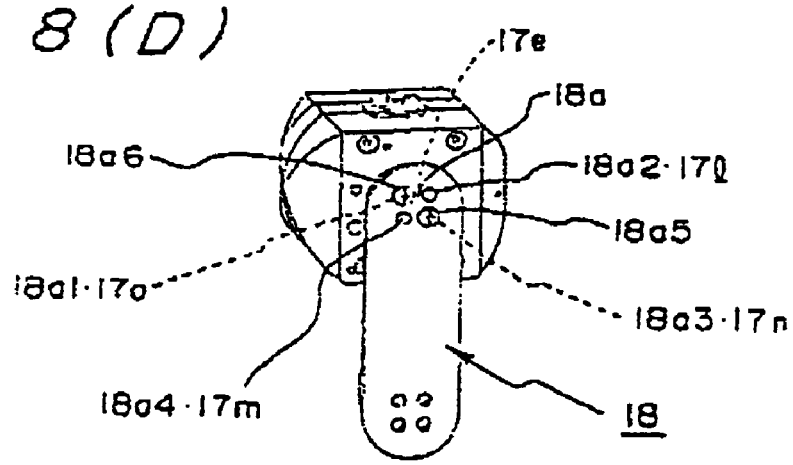
Figure 9A:
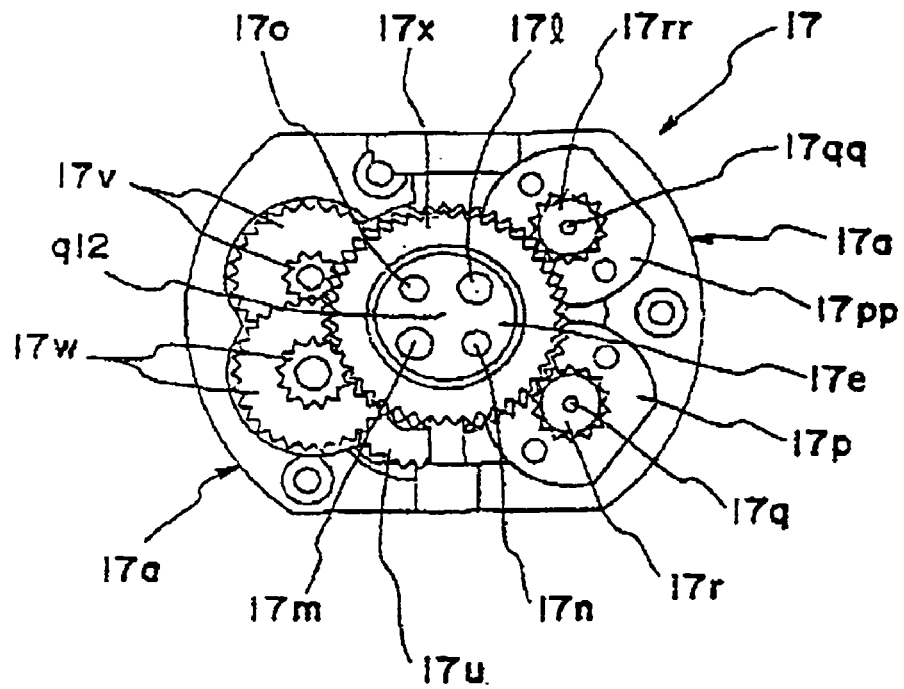
Figure 9B:
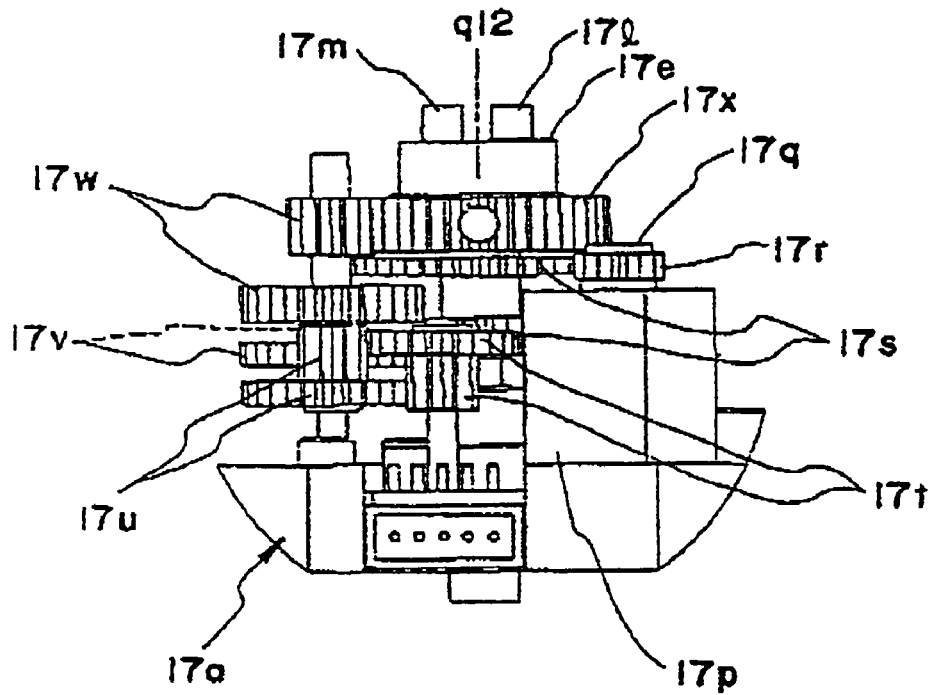
Figure 10:
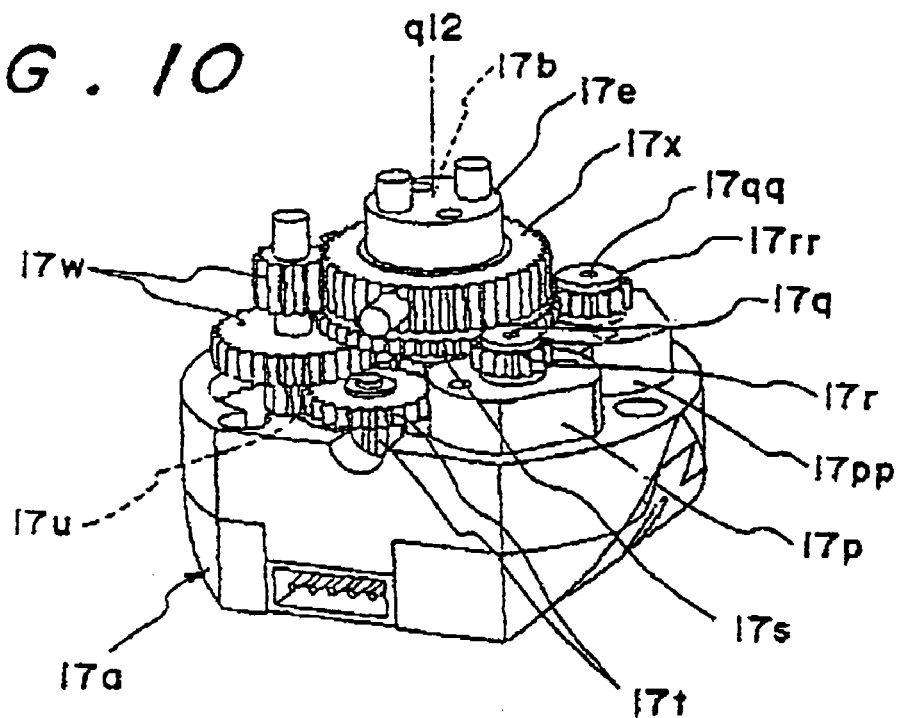
Figure 11:
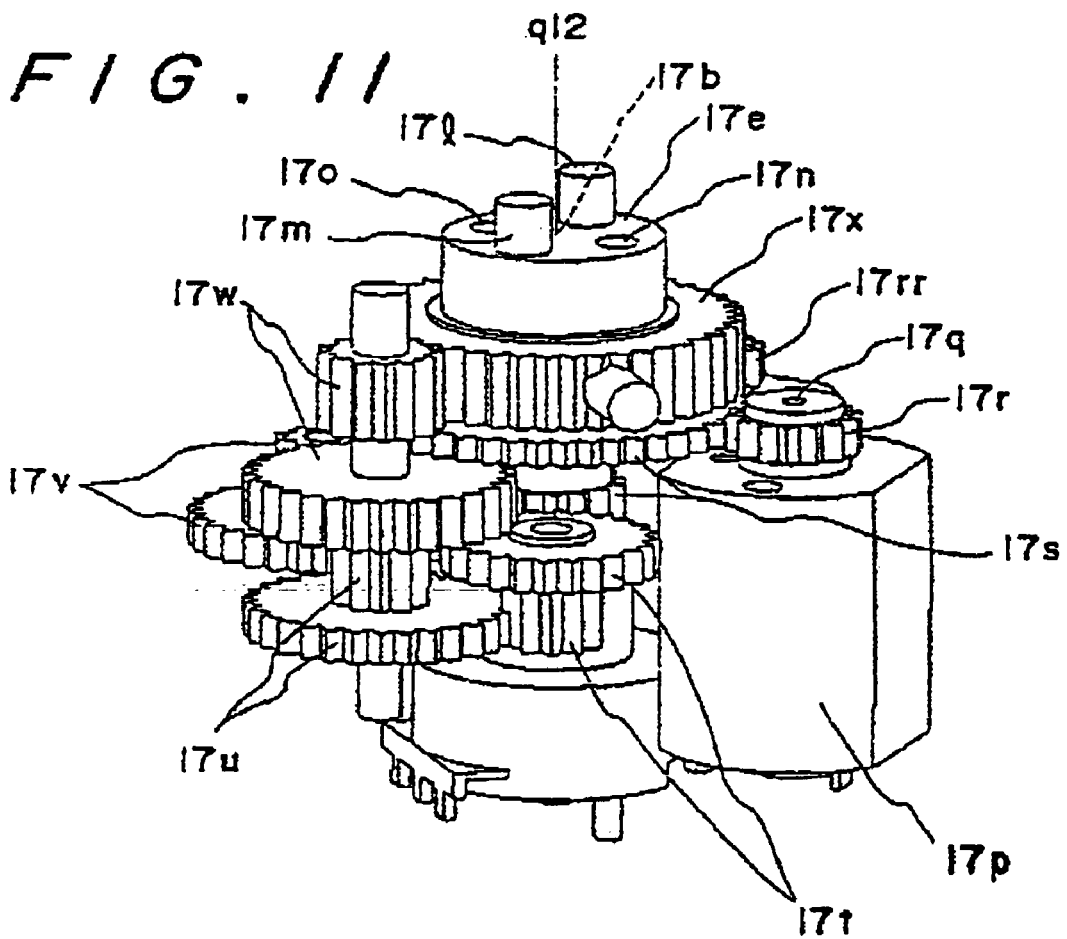

Further, applying this in a more universal sense, while the above description relates to a rotating joint means 17e with a so-called "cancellate" structure and fixed joint means 17g with the same configuration having two positioning projections 17l and 17m and two connecting screw holes 17n and 17o, as shown in FIG. 7, the "cancellate" structure in the example may be modified to a "multi-eye" structure as appropriate. A rotating joint means with a universal structure comprises N positioning projections disposed near the output rotating shaft at equal intervals along an arbitrary perimeter surrounding the center axis of the output rotating shaft, and N connecting holes disposed near the output rotating shaft at positions rotated by 360°/2N from the position of the N positioning projections, and a rotating joint receiving means connectable to rotating joint means, with a universal structure comprises 2N fitting holes for aligning with and fitting to the N positioning projections at positions rotated by 360°/2N from the position of the N positioning projections with the center axis of the output rotating shaft as the center thereof, wherein an arrangement in which, of the 2N fitting holes, N fitting holes other than the N fitting holes aligning with and fitting to the above N positioning projections are aligned with the N connecting screw holes on the rotating joint means and in which fixing by screwing can be performed at at least one fitting hole thereof, is sufficient. In the same way, it is self-evident that the fixed joint means with a universal structure is of the same configuration as the rotating joint means except for the point of being disposed so as to surround another center axis orthogonal to the center axis of the output rotating shaft, and that the fixed joint receiving means of a universal structure, that is connectable to the fixed joint means of the same configuration as the aforesaid rotating joint means, is also of the same configuration as the rotating joint receiving means.

Figure 12:
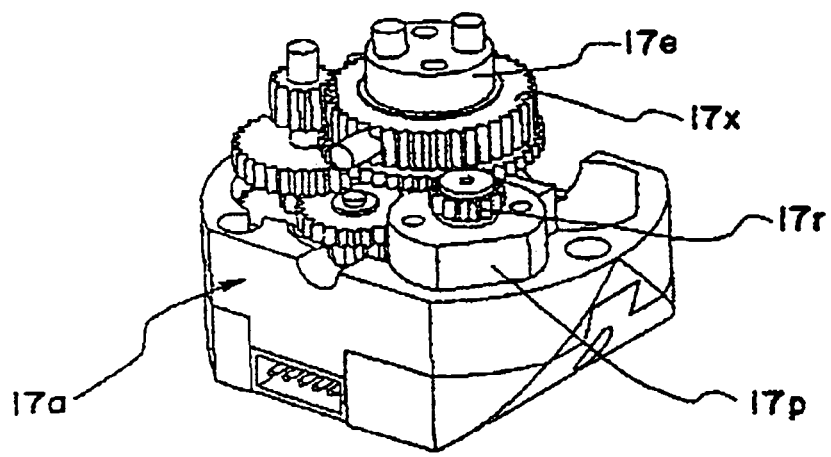
FIGS. 9(A), 9(B), 10, 11 and 12 relate to a third aspect of the present invention.

A best mode for carrying out a third aspect of the present invention will be described with reference to FIGS. 9(A), 9(B), 10, 11 and 12. Two motors 17p and 17pp serving as rotating driving means are fixed within the joint casing 17a of the orthogonal dual-axial cylindrical body of the joint unit 17, two driving gears 17r and 17rr separately on the driving rotating shafts 17q and 17qq of the two motors separately fit each to the receiving teeth of one intermediate gear 17S, the driving teeth of the intermediate gear 17s fit to the receiving teeth of a third-stage reducing gear 17t, the driving teeth of the gear 17t fit to the receiving teeth of a fourth-stage reducing gear 17u, the driving teeth of the gear 17u fit to the receiving teeth of a fifth-stage reducing gear 17v, the driving teeth of the gear 17v fit to the receiving teeth of a sixth-stage reducing gear 17w, and the driving teeth of the gear 17w fit to the receiving teeth of a seventh-stage reducing gear 17x, and thus these are disposed around the center axis q12 of the output rotating shaft 17e so as to reduce the rotations of the motors 17p and 17pp serving as the rotating driving means and transmit them to the output rotating shaft 17e, so as to configure a reducing means by the multi-stage reducing gear trains encapsulated in the joint casing 17a, and the two motors 17p and 17pp serving as the rotating driving means themselves also being encapsulated in the same joint casing 17a to be assembled to the inner perimeter portion centered on the output rotating shaft 17b within the casing 17a assuming an attitude such that the two driving rotating shafts 17q and 17qq are parallel as to the output rotating shaft 17b. The center axis q 12 of the last-stage reducing gear 17x is the center axis of the output rotating shaft 17b on the center axis of the orthogonal dual-axis cylindrical body of the joint casing 17a, and the rotating joint means 17e having the center axis q12 as a shared center axis is formed onto the gear 17x. Upon the two driving gears 17r and 17rr of the two motors 17p and 17pp being rotationally driven, the driving gears 17r and 17rr cooperatively drive the intermediate gear 17s, and by the reducing gear train of each stage transmitting reduced reverse rotations in conjunction, the last-stage reducing gear 17x and ultimately the rotating joint means 17e are driven with rotations of a reduced speed in the same direction as that of the motors 17p and 17pp. In the configuration shown as an example in FIGS. 9(A), 9(B), 10 and 11, the two driving gears 17r and 17rr of the two motors 17p and 17pp mesh with a single tooth row of receiving teeth of one intermediate gear 17s. An arrangement, however, may be employed wherein one of the two motors 17p and 17pp, the motor 17pp in the example shown in FIG. 12, is omitted, according to the external mechanical load.

All of the components of the two motors 17p and 17pp, serving as rotating driving means, and the multi-stage gear train 17r, 17s, 17t, 17u, 17v, 17w, and 17x, serving as reducing means, may be encapsulated in a joint casing 10a of a dice-like cube with sides twice the joint means separation distance d as shown in the example in FIG. 1, or may be encapsulated in a joint casing 11a of a uniaxial cylindrical body having a cylindrical surface profile with an axial length of twice the joint means separation distance d shown in the example in FIG. 1, wherein the center axis q3 of the cylinder is a center axis q3 shared with that of the output rotating shaft 11b, as shown in FIG. 2, or may be encapsulated in a joint casing 14a of an orthogonal dual-axis cylinder-like cube as shown in FIG. 4, having an orthogonal dual-axis cylinder-like cube surface profile, illustrated by way of example in FIG. 6(B) configured of the overlapping enclosing portions of two cylindrical body portions Q9 and Q10 with equal axial lengths of twice the joint means separation distance d shown by way of example in FIG. 6(A), having two orthogonal axes q5 and q6 as the center axes of each, wherein the center axis q9 of one cylindrical body portion Q9 of the two cylindrical body portions Q9 and Q10 is shared with the center axis q5 of the fixed joint means 14g, and the center axis q10 of the other cylindrical body portion Q10 is shared with the other center shaft q6 intersecting with the center shaft q5. Further, with these joint casings illustrated in the examples, as is most clearly illustrated in FIG. 1, which illustrates an example of a dice-like cube as a basic form of the joint casing, the output rotating shaft 10b passes through and extends outward, four fixing screw holes 19a, 19b, 19c, and 19d are bored each at the four corners on one surface 10c where rotating joint means 10e are implemented, the joint unit fixing means for fixing the joint unit 10 itself to an external component such as, for example, a later-described dual-axial joint power transmission unit or a zero-degree joint power transmission unit, or the like, is thus configured; a rotating joint means-corresponding axially-supporting pin 21a is erected outwardly at a position of the surface 10d through which the center axis q1 of the rotating joint means 10e passes and which surface 10d is opposed to the surface 10c of the joint casing 10a where the rotating means 10e is provided, a double-use rotating-joint-corresponding stay-axially-supporting means for rotatably axially supporting, for example, the later-described double stay corresponding to the rotating joint means, as to the joint unit 10 itself, is thus configured; a fixed joint means-corresponding axially-supporting pin 21b is erected so as to extend outwardly at the position where the center axis q2 of the fixed joint means 10g passes through the surface 10h of the joint casing 10a opposing the surface 10f where the fixed joint means 10g is provided, and a double-use fixing joint-corresponding stay-axially-supporting means for rotatably axially supporting, for example, the later-described double stay to the joint unit 10 itself, corresponding to the fixed joint means, are thus configured.

Figure 13B:
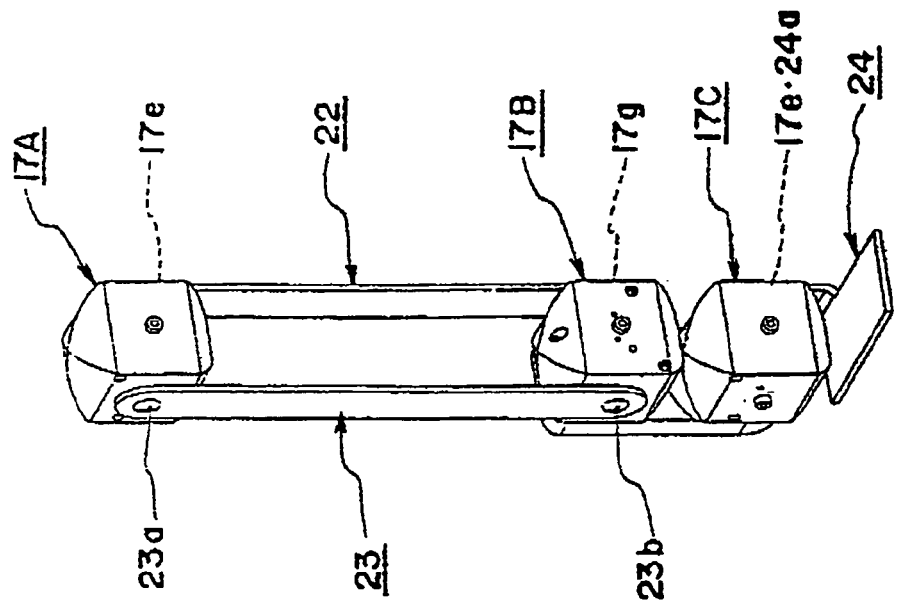
FIGS. 13(A) and 13(B) relate to a fourth aspect of the invention, illustrating a perspective view of a single stay and a double stay.
Figure 13A:
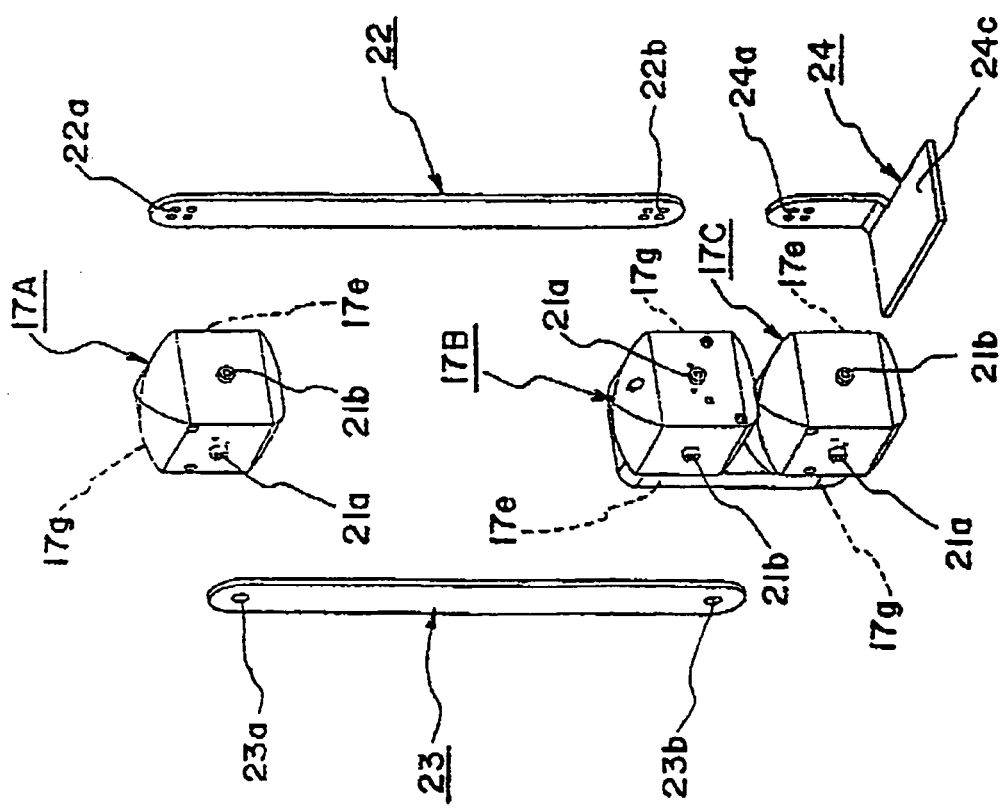

A best mode for carrying out a fourth aspect of the present invention will be described with reference to FIGS. 13(A) and 13(B). FIGS. 13(A) and 13(B) show the joint unit 17 shown as an example in FIG. 7 again, wherein the double-use rotating-joint-corresponding stay-axially-supporting means 21a and the double-use fixed-joint-corresponding stay-axially-supporting means 21b provided to the joint units 17A, 17B, and 17C, in the drawing, correspond to the respective double-use rotating-joint-corresponding stay-axially-supporting means 21a and the double-use fixed-joint-corresponding stay-axially-supporting means 21b provided to the joint unit 10 shown in FIG. 1, and ensure the same functions based on the same configurations correspondingly. As shown in FIG. 13(A), four fitting holes serving as rotating joint receiving means 22a are bored on one end of a single stay 22 formed of a long plate-shaped rigid member, ensuring the same functions based on the same configuration as the rotating joint receiving means 18a on the connecting bar 18 shown in the example in FIG. 7, and the aforesaid single stay 22 is detachably connected to the rotating joint means 17e of the joint unit 17A by the connecting screws. Four fitting holes serving as the fixed joint receiving means 22b are bored on the other end of the single stay 22, ensuring the same function based on the same configuration as the fixed joint receiving means 18b on the connecting bar 18 shown in the example in FIG. 7, and are detachably connected by means of the connecting screws to the fixed joint means 17g of the joint unit 17B. As shown in FIG. 13(B), the two joint units 17A and 17B may be connected with one single stay 22 by assembling the joint units 17A and 17B to the single stay 22; a double stay 23, however, may also be assembled thereby according to the necessity in view of the mechanical conditions. Returning to FIG. 13(A), an axially supporting hole serving as the axially-supporting receiving means 23a is bored at one end of the double stay 23 formed of the long plate-shaped rigid member, being fitted detachably and rotatably to the axially-supporting pin serving as the rotating-joint-corresponding axially-supporting means 21a of the joint unit 17A. An axially supporting hole serving as axially-supporting receiving means 23b is also bored at the other end of the double stay 23, being fitted detachably and rotatably to the axially-supporting pin serving as the fixed-joint-corresponding axially-supporting means 21b of the joint unit 17A. As shown in FIG. 13(B), the joint units 17A and 17B can be connected one to another with both the single stay 22 and the additional double stay 23, by assembling the two joint units 17A and 17B to the double stay 23. Note that in the example in the drawings, between the rotating joint means 17e of the joint unit 17B and the fixed joint means 17g of the joint unit 17C is lined by a later-described dual-axial joint power transmission unit, and a later-described toe plate 24 is connected to the rotating joint means 17e of the joint unit 17C via a rotating joint receiving means 24a which is equivalent to the rotating joint receiving means 22a of the single stay 22.

Figure 14A:
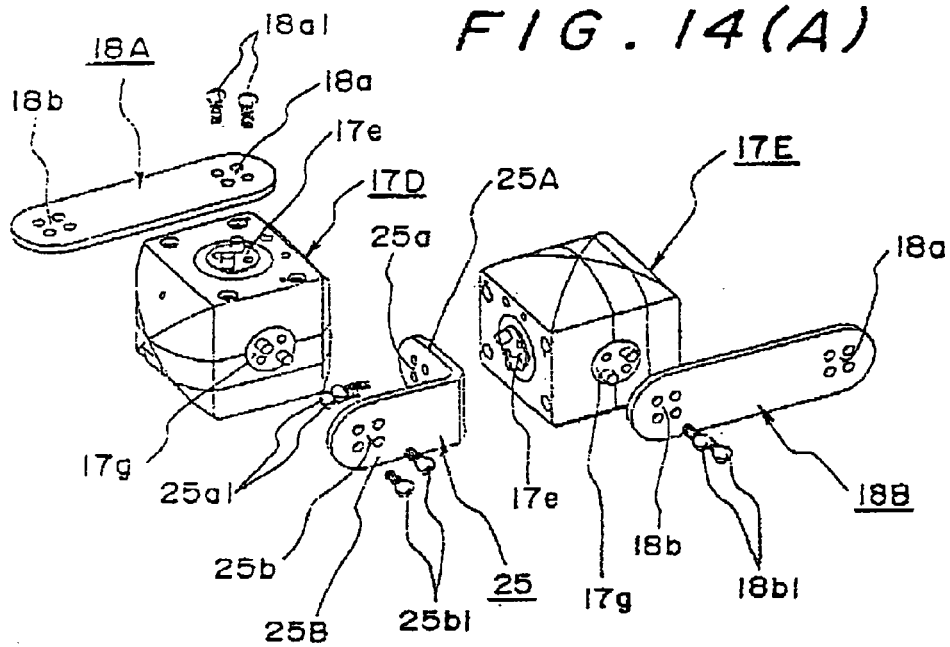
FIGS. 14(A) and 14(B) relate to a fifth aspect of the invention, illustrating a perspective view of an L-shaped stay.
Figure 14B:
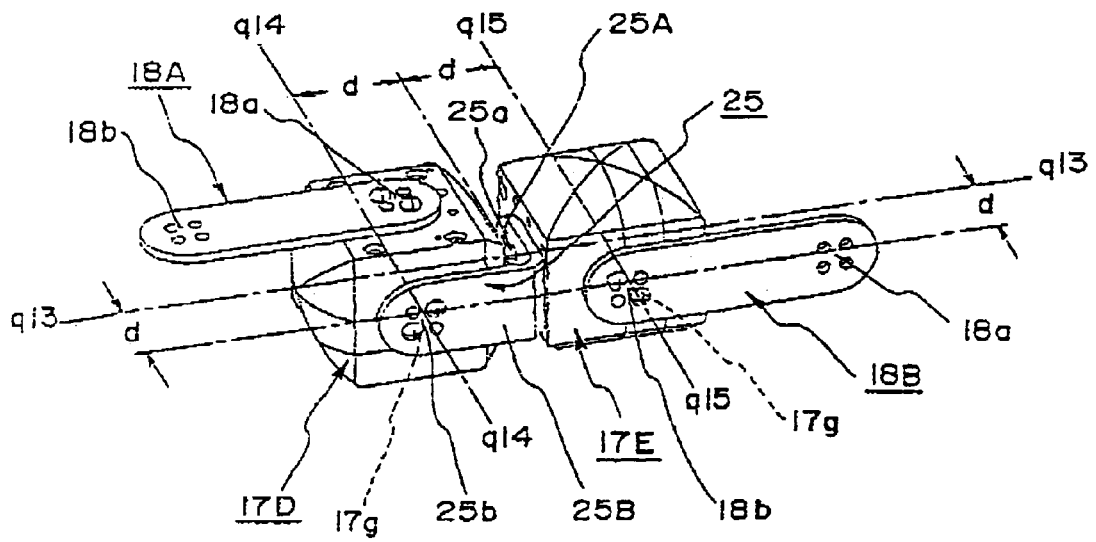

A best mode for carrying out a fifth aspect of the present invention will be described with reference to FIGS. 14(A) and 14(B). FIG. 14(A) also shows the joint unit 17 shown as an example in FIG. 7 again, wherein fixed joint receiving means 25b provided on one end of a L-shaped stay 25 is detachably connected by a connecting screw 25b1 to the fixed joint means 17g provided on a joint unit 17D in the figure, and the rotating joint means 17e provided on another joint unit 17E is detachably connected by a connecting screw 25*a*1 to the rotating joint receiving means 25*a* provided on the other end of the L-shaped stay 25. The L-shaped stay 25 itself is formed of a long L-shaped rigid member, and is configured such that one side portion 25B which extends to contain one end portion where the fixed joint receiving means 25*b* is provided and another side portion 25A which extends to contain the other end portion where the rotating joint receiving means 25*a* is provided intersect orthogonally. The fixed joint receiving means 25*b* of the one side portion 25B and the rotating joint receiving means 25*a* of the other side portion 25A may be of the same configuration, e.g., both being equivalent to the four fitting holes 18*a*1, 18*a*2, 18*a*3, and 18*a*4, serving as the rotating joint receiving means 18*a* on the connecting bar 18 shown as an example in FIG. 7. Note that the two connecting bars 18A and 18B in the figure are the same as those shown as an example in FIG. 7, wherein the rotating joint receiving means 18*a* of one connecting bar 18A is connectable to the rotating joint means 17*e* of one joint unit 17D by a connecting screw 18*a*1, and the fixed joint receiving means 18*b* of the other connecting bar 18B is connectable to the fixed joint means 17*g* of the other joint unit 17E by a connecting screw 18*b*1. FIG. 14(B) is a perspective view illustrating the state wherein the above-described parts are assembled, and as indicated by the additional lines in the figure, the separation distance between the center axis q13 of the rotating joint receiving means 25*a* of one side portion 25A of the L-shaped stay 25 and the other side portion 25B itself is set so as to be the joint means separation distance d already described with reference to FIG. 1. According to such a separation-distance setting, as most clearly shown in FIG. 14(B), a pair of top faces, a pair of bottom faces and a pair of side faces orthogonal to the center axes q14 and q15, of the two joint units 17D and 17E mutually connected by means of the L-shaped stay 25, are relatively rotationally driven following the perimeter of a cylinder having the center axis q13 shared by both joint units 17D and 17E as the center axis thereof, so that rotational driving on a shared center axis without unnatural sensations is ensured. Applying this in a more universal sense, the separation distance between the center axis q14 of the fixed joint receiving means 25*b* of one side portion 25B and the other side portion 25A itself may be similarly set so as to be the joint means separation distance d, and the separation distance between the center axis q15 of the fixed joint means 17*g* of the joint unit 17E connected to the fixed joint receiving means 18*b* of the connecting bar 18B, and the one side portion 25A of the L-shaped stay 25, may be similarly set so as to be the joint means separation distance d.

A best mode for carrying out a sixth aspect of the present invention will be described with reference to FIGS. 15(A), 15(B) and 16(A)–16(D). A dual-axis joint power transmission unit 26 is organized in a long plate-shaped cubic casing 26*a*. Encapsulated in the casing 26*a* is an input joint rotating shaft 26*b* rotatably axially supported by the casing 26*a* on a center axis q16 so as to pass through both top and bottom faces of the casing 26*a* to extend outward in the figure, an intermediate gear 26*d* rotationally axially supported by the casing 26*a* so as to mesh with a driving gear 26*c* rotating on the input joint rotating shaft 26*b*, and an output joint rotating shaft 26*f* rotatably axially supported by the casing 26*a* on a center axis q17, so as to pass through both top and bottom faces of the casing 26*a* to extend outward in the figure and have a slave gear 26*e* rotating on the axis q17, which slave gear 26*e* fits perfectly into the intermediate gear 26*d*.

Figure 15A:
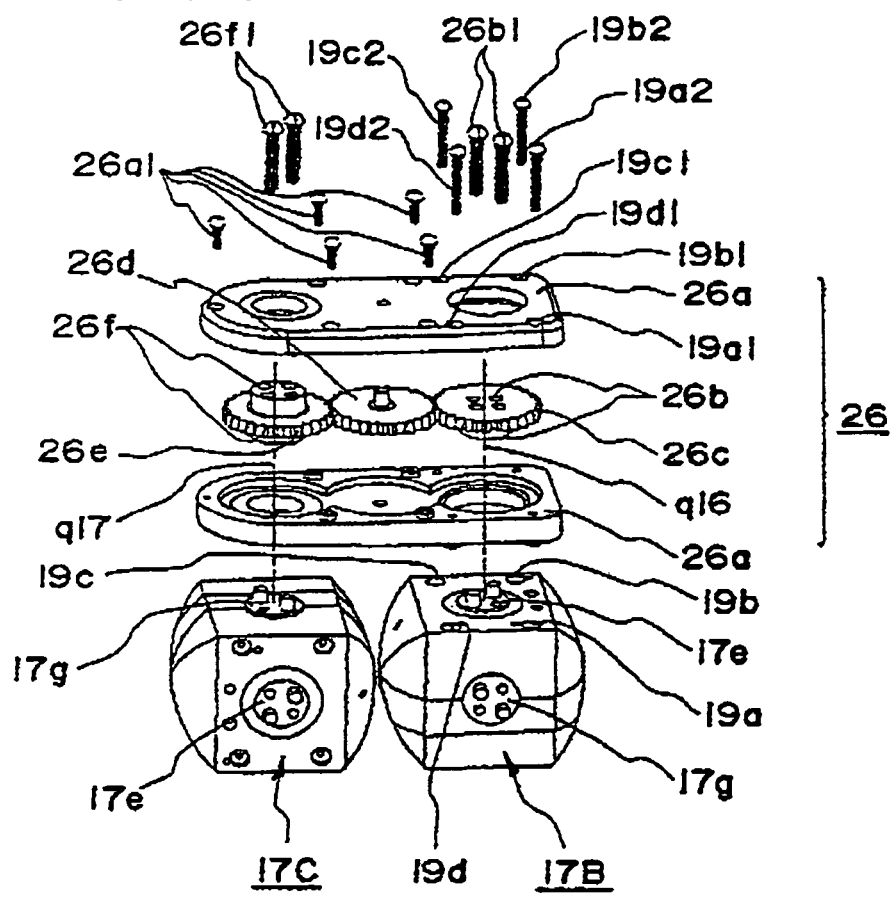
Figure 15B:
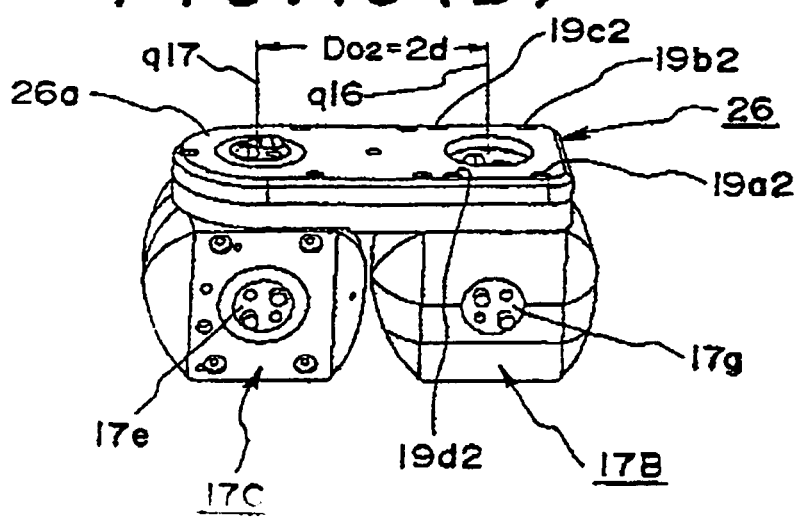

On the input joint rotating shaft 26*b*, fitting holes of the same configurations as the four fitting holes 18*a*1 through 18*a*4 serving as the rotating joint receiving means 18*a* shown as an example in FIG. 7, are detachably connected by the connecting screws 26*b*1 to the rotating joint means 17*e* on the joint unit 17B shown below in FIG. 15(A), wherein the aforesaid fitting holes pass through the shaft 26*b* longitudinally so that the top face of the casing 26*a* communicates with the bottom face thereof. An input joint rotating shaft connecting means is configured from the fitting holes in the input joint rotating shaft 26*b* here and the connecting screws 26*b*1. Also, on the output joint rotating shaft 26*f*, fitting holes of the same configuration as the four fitting holes serving as the fixed joint receiving means 18*b* shown as an example in FIG. 7, are detachably connected by the connecting screws 26*f*1 to the fixed joint means 17*g* of the joint unit 17C shown below in FIG. 15(A), wherein the aforesaid fitting holes pass through the shaft 26*f* longitudinally so that the top face of the casing 26*a* communicates with the bottom face thereof. An output joint rotating shaft connecting means is configured from the fitting holes in the output joint rotating shaft 26*f* here and the connecting screws 26*f*1. Four through holes 19*a*1, 19*b*1, 19*c*1, and 19*d*1 serving as the joint unit fixing receiving means bored and displaced so as to be aligned with the fixing screw holes 19*a*, 19*b*, 19*c*, and 19*d*, serving as the joint unit fixing means on the joint unit 17B shown below in FIG. 15(A), are provided around the perimeter of the driving gear 26*c* of the input joint rotating shaft 26*b* of the casing 26*a*, and in the state that the input joint rotating shaft 26*b* and the rotating joint means 17*e* are connected, the joint unit 17B is fixed to the casing 26*a* by screwing the fixing screws 19*a*2, 19*b*2, 19*c*2, and 19*d*2 to the fixing screw holes 19*a*, 19*b*, 19*c*, and 19*d*, via the through holes 19*a*1, 19*b*1, 19*c*1, and 19*d*1. Upon the rotating joint 17*e* of the joint unit 17B fixed to the casing 26 being rotationally driven in the counter-clockwise direction in the figure, the input joint rotating shaft 26*b* also rotates en bloc in the counter-clockwise direction in the figure around the center axis q16, the intermediate gear 26*d* in turn rotates in the clockwise direction in the figure, and to interact with this, further, the output joint rotating shaft 26*f* rotates in the counter-clockwise direction in the figure around the center axis q17, and accordingly, the fixed joint means 17*g* of the joint unit 17C rotates as one body together with the output joint rotating shaft 26*f*. This results in the joint unit 17C per se rotating in the counter-clockwise direction in the figure around the center axis q17, in relative relation with the dual-axis joint power transmission unit 26. With the configuration illustrated as an example in FIG. 15(A), the joint rotation converting means is configured of the driving gear 26*c* rotating on the input joint rotating shaft 26*b*, and the intermediate gear 26*d*. While the slave gear 26*e* rotating on the center axis q17 of the output joint rotating shaft 26*f*, and while the rotations of the input joint rotating shaft 26*b* are converted into rotations of the same speed and in the same direction, provided that the gears are of the same diameter and have the same number of teeth to transmit the rotations to the output joint rotating shaft 26*f*, an arrangement may be made by selecting the gear configuration wherein the rotations of a changed speed as well as in a reversed direction are transmitted to the output joint rotating shaft 26*f*. FIG. 15(B) illustrates a perspective view of a structure wherein the casing 26*a* is closed up by means of the screws 26*a*1 with the components shown in the example in FIG. 15(A) being encapsulated therein. As can be clearly understood by reference to the additional lines in the figure, the separation distance in the longitudinal direction of the casing 26*a* between the center axis q 16 of the input joint rotating shaft 26*b* and the center axis q17 of the output joint rotating shaft 26*f* can be reduced to the minimum joint unit separation distance, and in this case, both the joint unit 17B connected to the input joint rotating shaft 26*b* and the joint unit 17C connected to the output joint rotating shaft 26*f* have a uniform joint means separation distance d, so that in the case of the orthogonal dual-axis cylinder-like cube shown in the example in FIG. 4, the minimum joint unit separation distance Do2 here reaches a value equal to twice the joint means separation distance d. On the other hand, in another case, each of the joint units connected to the input joint rotating shaft 26*b* and the output joint rotating shaft 26*f* have a uniform joint means separation distance d, so that in the case of the uniaxial cylindrical body shown in the example in FIG. 2, the minimum joint unit separation distance Do1 here reaches a value greater than twice the joint means separation distance d.

FIGS. 16(A) to 16(D) are perspective views extracting and illustrating the two joint units 17B and 17C in FIGS. 13(A) and 13(B), wherein the rotating joint means 17*e* of the joint unit 17B is connected to the input joint rotating shaft 26*b* of the dual-axial joint power transmission unit 26, and the fixed joint means 17*g* of the joint unit 17C is connected to the output joint rotating shaft 26*f* of the dual-axial joint power transmission unit 26. Upon the rotating joint means 17*e* of the joint unit 17C being rotationally driven in the clockwise direction in the figure around the center axis q18 of the rotating joint means 17*e*, the toe plate 24, connected to the rotating joint means 17*e* is rotationally driven via the rotating joint receiving means 24*a* in the clockwise direction in the figure around the center axis q18, so that a rolling motion of the toe plate 24, wherein the toe tip 24*b* of the toe plate 24 rises, as shown in FIG. 16(B), is secured. On the other hand, upon the rotating joint means 17*e* of the joint unit 17B being rotationally driven in the clockwise direction in the figure around the center axis q16 of the rotating joint means 17*e*, the input joint rotating shaft 26*b* of the dual-axial joint power transmission unit 26 is rotated in the clockwise direction in the figure around the center axis q16, the output joint rotating shaft 26*f* of the unit 26 rotates in the clockwise direction in the figure around the center axis q17, and as shown in FIG. 16(C), the joint unit 17C connected to the rotating shaft 26*f* via the fixed joint means 17*g* rotates around the center axis q17 in the clockwise direction in the figure, and consequently, a pitching motion of the toe plate 24, wherein the entire toe plate 24 rotates in the clockwise direction around the center axis q17, is secured. The rotational motion using such a dual-axial joint power transmission unit 26 is characterized in that the center axis q18 for the rolling motion of the toe plate 24 and the center axis q17 for the pitching motion of the toe plate 24 orthogonally intersect at an intersection q00, and due to such a characteristic, the movement of the toe plate 24 appears to be a natural movement similar to the movement of the leg of a living creature. It can be said that this characteristic is due to converting the rotations of the rotating joint means 17*e* of the joint unit 17B around the center axis q16 into rotations of the fixed joint means 17*g* of the joint unit 17C around the center axis q17 by means of the dual-axial joint power transmission unit 26; in other words, in the figure, by shifting a rotating motion of the center axis q16 at a higher level which never intersects orthogonally with the center axis q18 to a rotating motion of the center axis q17 at a lower level which intersects orthogonally with the center axis q18.

Conversely, as shown in FIG. 16(D), assuming a case wherein between the rotating joint means 17*e* of the joint unit 17B and the fixed joint means 17*g* of the joint unit 17*c* are connected by a non-active member, such as the connecting bar 18 shown in the example in FIG. 7, as the rotations of the rotating joint means 17*e* of the joint unit 17B progress, the joint unit 17C is rotationally driven around the center axis q16 of the rotating joint means 17*e* of the joint unit 17B side, via the connecting bar 18. In this case, the rolling motions of the toe plate 24 around the center axis q18 are the same as those shown in the example in FIG. 16(B), consequently the pitching motion of the toe plate 24 being performed around the center axis q16 which never intersects orthogonally with the center axis q18 of the rolling motion. This causes an unnatural rotational motion of the toe plate 24 to be encountered.

A best mode for carrying out a seventh aspect of the present invention will be described with reference to FIGS. 17(A), 17(B) and 18(A)–18(D). A zero-degree joint power transmission unit 27 is organized in a long plate-shaped cubic casing 27*a*. Encapsulated in the casing 27*a* is an input joint fixed shaft 27*b* fixed to the casing 27*a* on a center axis q19 so as to pass through both top and bottom faces of the casing 27*a* in the figure so as to extend outward, a first intermediate gear 27*c* rotationally axially supported by the casing 27*a* so as to face an annular space 27*g* formed around the perimeter of the input joint fixed shaft 27*b*, a second intermediate gear 27*d* rotationally axially supported by the casing 27*a* so as to mesh with the first intermediate gear 27*c*, and an output joint rotating shaft 27*f* rotatably axially supported by the casing 27*a* on a center axis q20 so as to pass through both top and bottom faces of the casing 27*a* to extend outward, wherein a slave gear 27*e* having the axis of aforesaid shaft 27*f* in common meshes with the second intermediate gear 27*d*. Now, a rotation reversal converting means is configured of the first intermediate gear 27*c*, the second intermediate gear 27*d*, and the slave gear 27*e* on the output joint rotating shaft 27*f*, with the rotations of an annular driving gear 28*e* being converted into reverse rotations of a predetermined speed, as described later. On the input joint fixed shaft 27*b* are fitting holes of the same configuration as the four fitting holes on the input joint rotating shaft 26*b* shown in the example in FIGS. 15(A) and 15(B) detachably connected by the connecting screws 27*b*1 to the rotating joint means 17*e* on the joint unit 17B shown below in FIG. 17(A), wherein the aforesaid fitting holes pass through the shaft 27*b* longitudinally so that the top face of the casing 27*a* communicates with the bottom face thereof. An input joint fixed shaft connecting means is configured from the fitting holes in the input joint fixed shaft 27*b* here and the connecting screws 27*b*1. Also on the output joint rotating shaft 27*f*, fitting holes of the same configuration as the four fitting holes on the input joint rotating shaft 26*b* shown as an example in FIGS. 15(A) and 15(B), are detachably connected by the connecting screws 27*f*1 to the fixed joint means 17*g* of the joint unit 17C shown below in FIG. 17(A), passing through the shaft 27*f* longitudinally with the top face of the casing 27*a* communicating with the bottom thereof. An output joint rotating shaft connecting means is configured from the fitting holes in the output joint rotating shaft 27*f* here and the connecting screws 27*f*1. Four connecting holes 28*a*, 28*b*, 28*c*, and 28*d* are bored and displaced in four corners of a connecting plate 28 formed of a square plate-shaped rigid member serving as a joint casing connecting means so as to be aligned with four fixing screw holes 19*a*, 19*b*, 19*c*, and 19*d*, serving as a joint unit fixing means on the joint unit 17B shown below in FIG. 17(A). The connecting plate 28 can be attached to the upper face where the rotating joint means 17*e* of the joint unit 17B is provided in a conventional configuration. An annular driving gear 28*e* is formed at the center portion on the upper face of the connecting plate 28 in the figure, having annular outer teeth thereon, and a cylindrical space through which the upper face of the annular driving gear 28e of the connecting plate 28 communicates with the lower face thereof in the figure is formed on the inner center portion of the aforesaid annular driving gear 28e. The connecting plate 28 is assembled to the joint unit 17B in an attitude for the connecting plate 28 to allow the rotating joint means 17e to be encapsulated in a cylindrical space formed in an inner center portion of the annular driving outer gear 28e, so that the rotating joint means 17e is relatively rotational as to the annular gear 28e. Thus, the connecting plate 28 assembled to the joint unit 17B is further assembled to the casing 27a in an attitude for the connecting plate 28 to allow the annular driving gear 28e to be movably inserted into an annular space formed surrounding the input joint fixed shaft 27b so as to ensure relative rotations of the annular driving gear 28e around the input joint fixed shaft 27b and also to ensure meshing of the annular outer teeth of the annular gear 27c with the first intermediate gear. Upon the rotating joint means 17e of the joint unit 17B fixed to the casing 27a being rotationally driven in the counter-clockwise direction in the figure, the rotating joint means 17e and the input joint fixed shaft 27b of the casing 27a also en bloc rotate in the counter-clockwise direction in the figure around the center axis q19 in the relative relation with the connecting plate 28, and while such rotations are in progress, the joint unit 17C on the center axis q20 of the casing 27a performs the orbital motion-like revolving motions in the counter-clockwise direction in the figure around the center axis q19. Meanwhile, the first intermediate gear 27c, which meshes with the annular outer teeth of the annular gear 28e fixed to the joint unit 17B, is caused to travel along said annular outer teeth to rotate in the counter-clockwise direction in the figure, whereby the second intermediate gear 27d rotates in turn in the clockwise direction in the figure, which further causes the output joint rotating shaft 27f to rotate in the counter-clockwise direction in the figure on the center axis q20, so that consequently, the joint unit 17C performs the rotational motion on it's center axis q20 in the counter-clockwise direction in the figure, while performing the aforesaid orbital motion-like rotational motion in the counter-clockwise direction in the figure on the center axis q19. With the configuration illustrated as an example in FIG. 17(A), joint rotation converting means is configured of the annular gear 28e on the center axis q19 of the input joint fixed shaft 27b, the first intermediate gear 27c, the second intermediate gear 27d, and the slave gear 27e rotating around the center axis q20 of the output joint rotating shaft 27f, wherein, in the example shown in the figure, the rotations of the rotating joint means 17e of the joint unit 17B are converted into rotations of the same speed and same direction, and transmitted to the output joint rotating shaft 27f, so for example, a 180° rotation of the rotating joint means 17e on the center axis q19 in the counter-clockwise direction in the figure is accompanied by a 180° rotation of the output joint rotating shaft 27f on the center axis q20 in the counter-clockwise direction, so that consequently, taking the rotating joint means 17e as a reference, a 360° (0°) rotation in the counter-clockwise direction is ensured at the output joint rotating shaft 27f. An arrangement may be made by selecting the gear configuration wherein the speed of the rotations is changed to transmit the rotations of a different speed from that of the rotating joint means 17e to the output joint rotating shaft 27f.

Figure 17A:
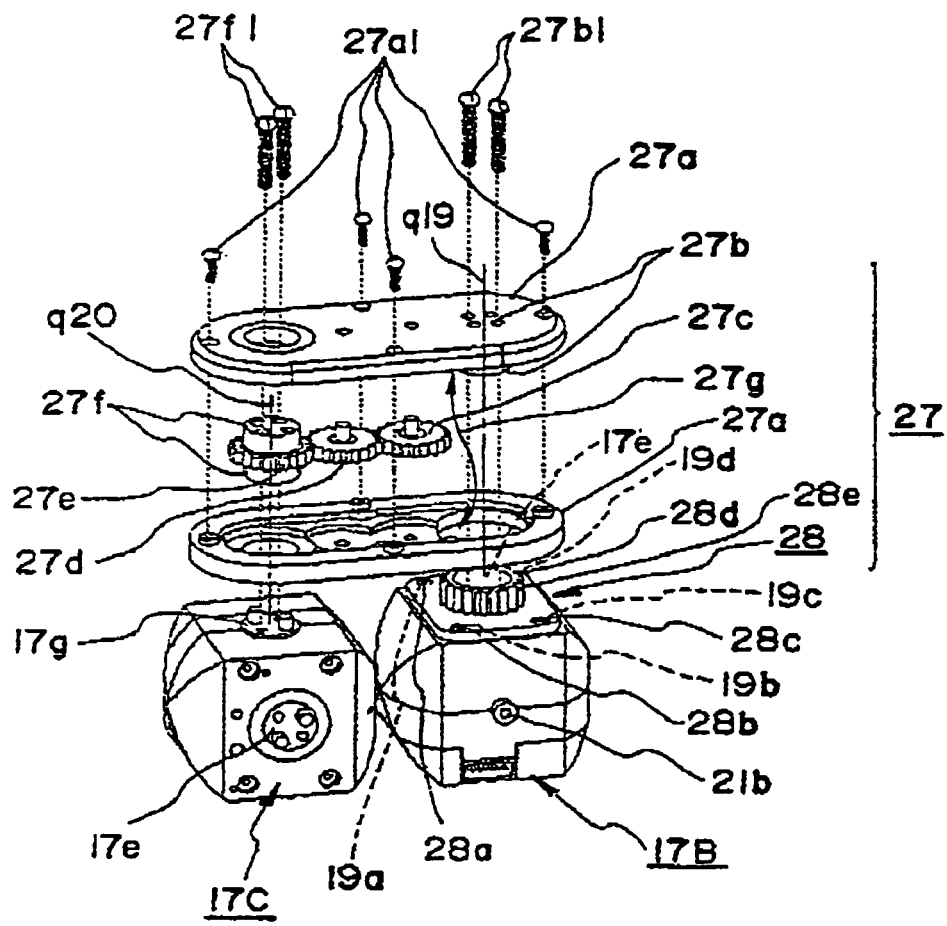
FIGS. 17(A), 17(B) and 18(A)–18(D) relate to a sixth aspect of the invention.
Figure 17B:
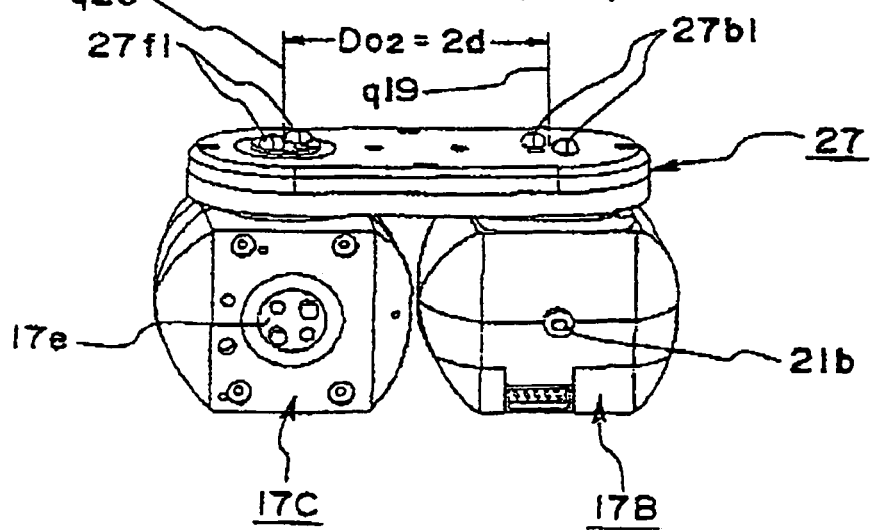
Figure 18A:
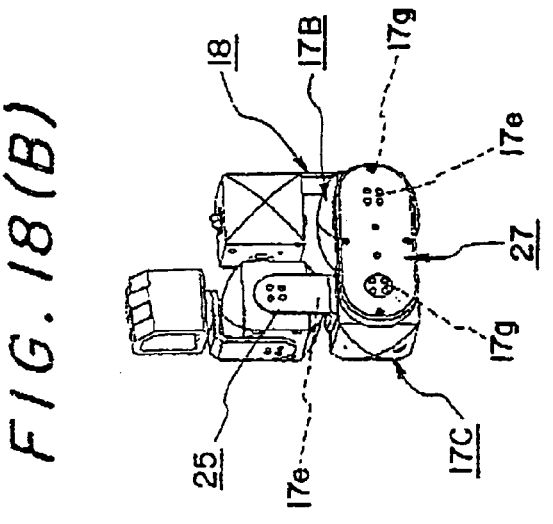
Figure 18B:
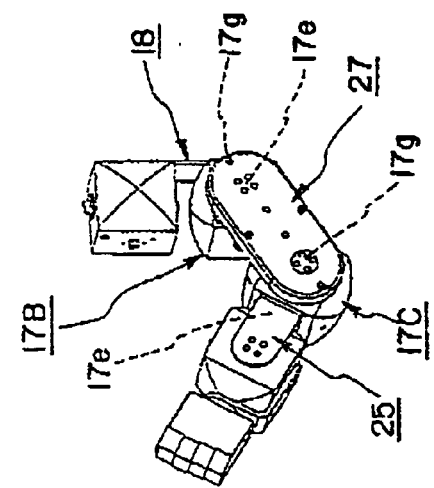

FIG. 17(B) illustrates a perspective view wherein the casing 27a is closed by means of screws 27a1 for the respective components shown in the example in FIG. 17(A) to be en bloc assembled within the casing 27a. As can be clearly understood by reference to the additional lines in the figure, only in the event that the separation distance in the longitudinal direction of the casing 27a between the center axis q19 of the input joint fixed shaft 27b and the center axis q20 of the output joint rotating shaft 27f can be reduced to the minimum joint unit separation distance Do2, the minimum joint unit separation distance Do2 here turns out to be a value equal to twice the joint means separation distance d. FIGS. 18(A)–18(D) are perspective explanatory diagrams of the configuration of a usage example wherein the configuration shown as an example in FIGS. 17(A) and 17(B) is assembled into a robot arm. As shown in FIG. 18(A), the rotating joint means 17e of the joint unit 17B is connected to the input joint fixed shaft 27b of the zero-degree joint power transmission unit 27, and the fixed joint means 17g of the joint unit 17C is connected to the output joint rotating shaft 27f of the zero-degree joint power transmission unit 27. Another joint unit is connected to the fixed joint means 17g of the joint unit 17B via the connecting bar 18, and a third joint unit is further connected to the rotating joint means 17e of the joint unit 17C via the L-shaped stay 25. Upon the rotating joint means 17e of the joint unit 17B rotating by 90° in the clockwise direction in the figure, the entire zero-degree joint power transmission unit 27 rotates by 90° in the clockwise direction in the figure on the rotating joint means 17e of the joint unit 17B, and causes the joint unit 17C to perform the orbital motion-like rotational motion by that angle, while the output joint rotating shaft 27f of the zero-degree joint power transmission unit 27 rotates by 90° in the clockwise direction in the figure and causes the joint unit 17C to perform the rotating motion on it's center axis q20 by that angle on the rotating shaft 27f as shown in FIG. 18(B), so that consequently, provided that the angular position of the connecting bar 18 connected to the fixed joint means 17g of the joint unit 17B is defined as a reference angular position, the angular position of the L-shaped stay 25 connected to the rotating joint means 17e of the joint unit 17C can be rotated 180°, i.e., such an angular position that the members 18 and 25 appear to stand in parallel with each other. In this case, the 90° rotations in the clockwise direction in the figure of the joint unit 17C generated by the 90° incremental angular position of rotations in the counter-clockwise direction in the figure of the joint unit 17B per se is also available. It is thus allowed for a rotational angular position of 360° (0°) to be established on the basis of the reference angular position of the connecting bar 18.

Figure 18C:
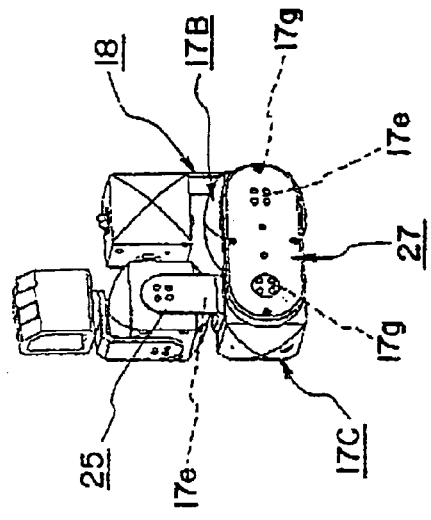
Figure 18D:
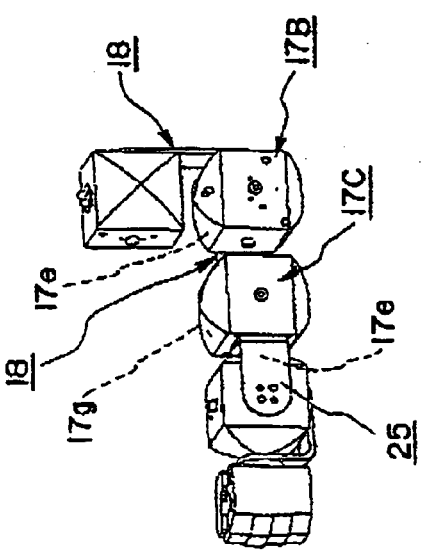

Conversely, as shown in FIG. 18(C), provided that the joint unit 17B and the joint unit 17C are connected by a non-active member such as the connecting bar 18 for example, instead of the zero-degree joint power transmission unit 27, while the rotations in the clockwise direction in the figure of the rotating joint means 17e of the joint unit 17B are in progress, the joint unit 17C, which remains fixed to the connecting bar 18, exclusively performs the orbital motion-like rotational motion in the clockwise direction in the figure on the rotating joint means 17e of the joint unit 17B. Accordingly, due to the mutual interference of the parts such as shown in FIG. 18(D), what is encountered here is such a disadvantage that the angular position of the 360° (0°) rotation of the L-shaped stay 25 connected to the rotating joint means 17e of the joint unit 17C is subjected to decisive constraints, provided that the angular position of the connecting bar 18 connected to the fixed joint means 17g of the joint unit 17B is defined as a reference angular position.

A best mode for carrying out an eighth aspect of the present invention will be described with reference to FIG.

Figure 19:
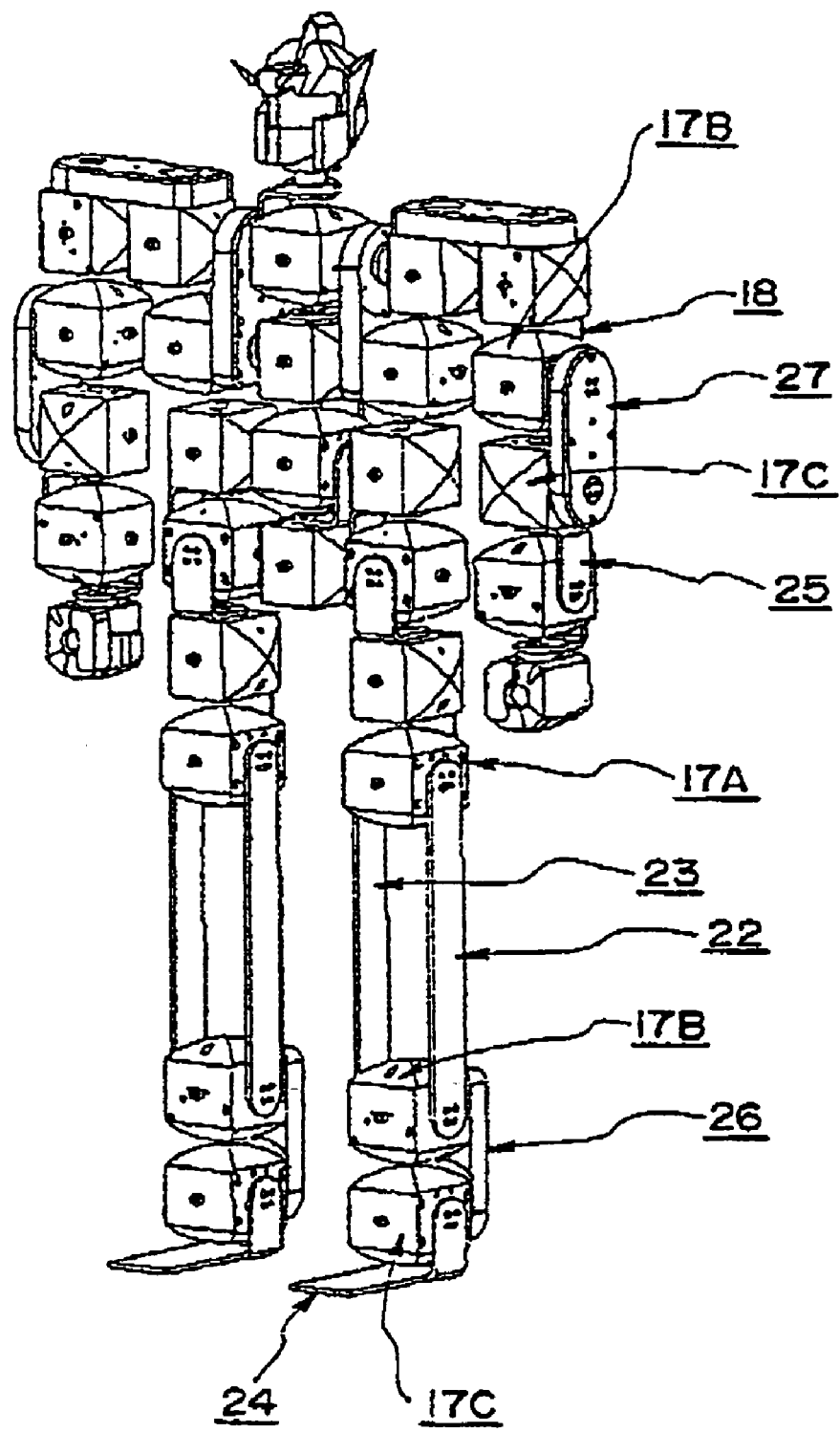
FIG. 19 is a perspective view of a unit set for a robot utilizing joint units of the present invention.
Figure 20:
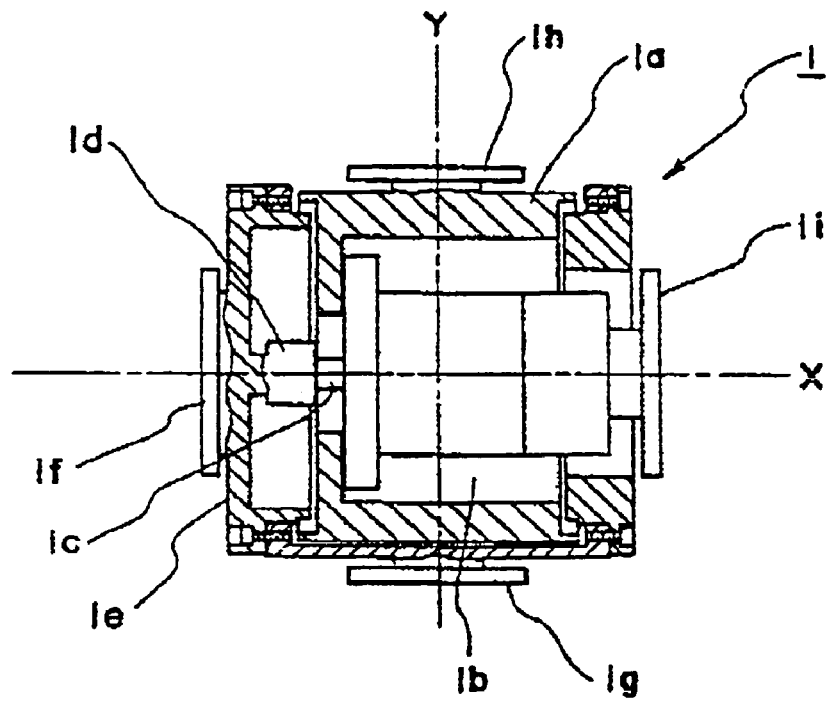
FIG. 20 is a cross-sectional view of a conventional joint unit.
Figure 21:
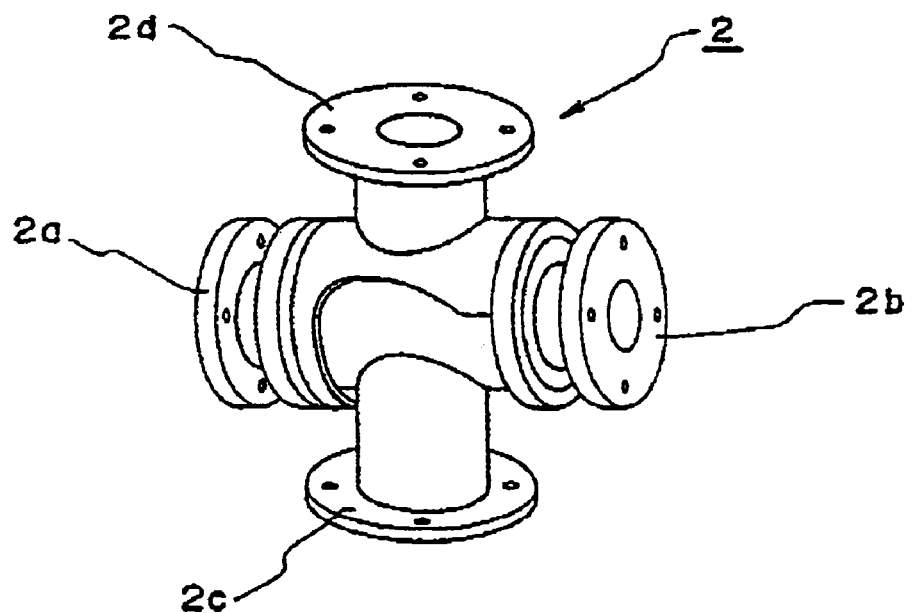
FIG. 21 is a perspective view of a conventional joint unit.
Figure 24:
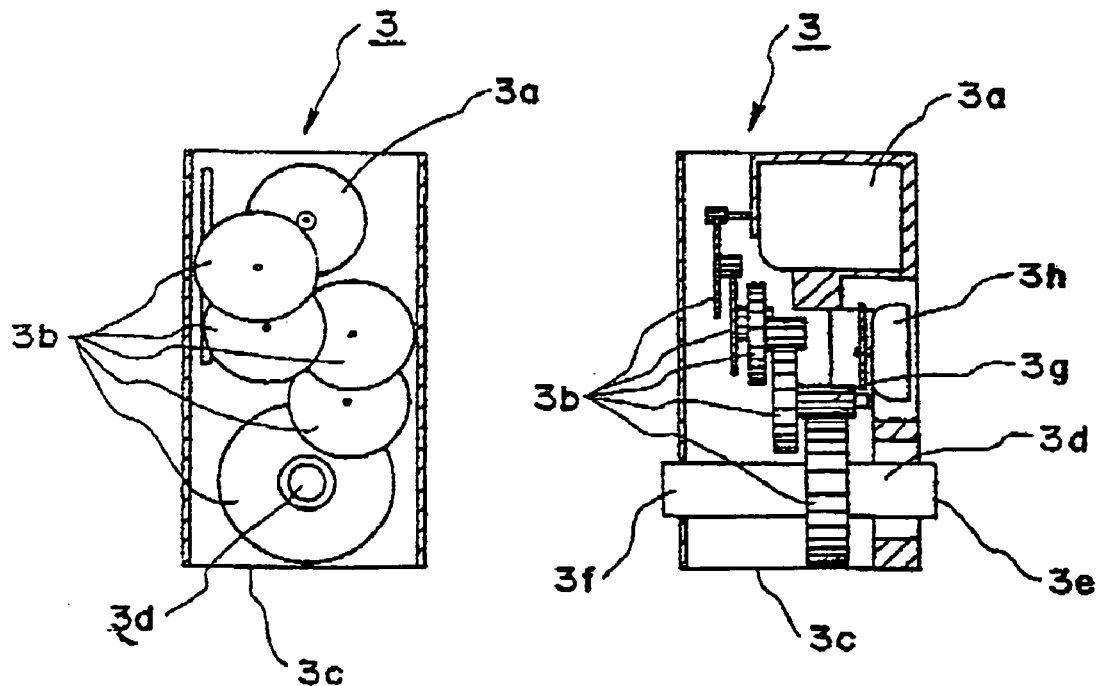
FIG. 24 illustrates front and side perspective cut-away views of a multi-stage reducing gear train of a conventional joint unit.
Figure 25:
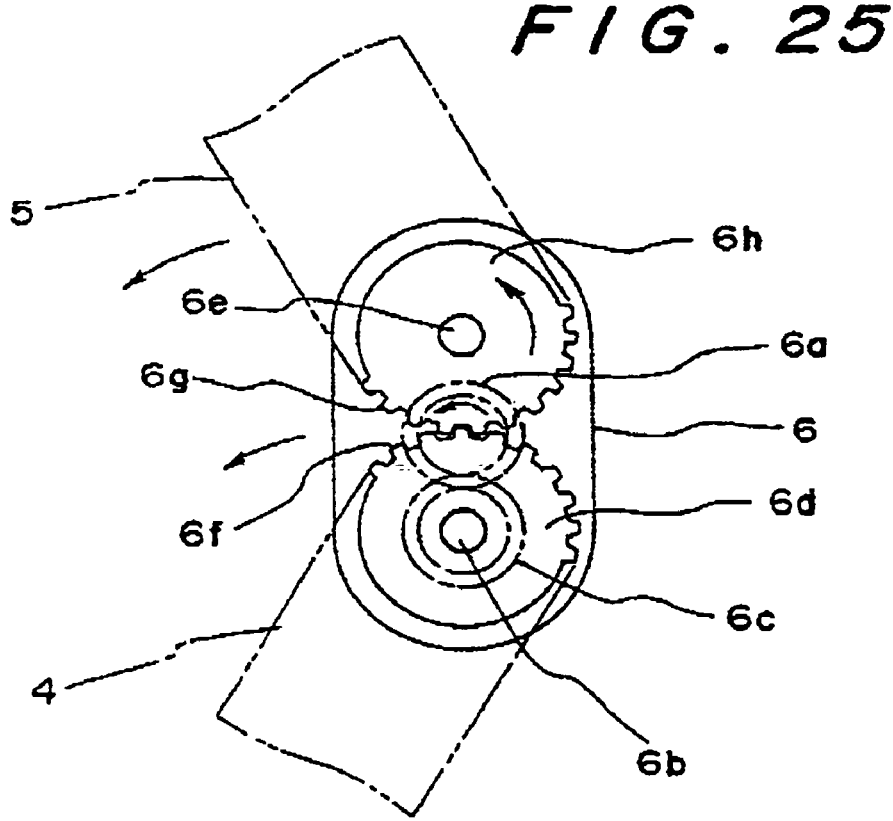
FIG. 25 is a partial cut-away perceptive view of a conventional flexional structure utilizing first and second arms.

19. The structure shown as an example in FIG. 19 is constructed by assembling unit sets for robots. The unit sets for robots shown here include the robot joint units 10, 11, 13, 14, 16, 17, shown in the examples in FIG. 1, FIG. 2, FIG. 4, and FIG. 7, the robot connecting bar 18 shown in the example in FIG. 7, the single stay 22 and double stay 23 shown in the example in FIGS. 13(A) and 13(B), the robot L-shaped stay 25 shown in the example in FIGS. 14(A) and 14(B), the robot dual-axial joint power transmission unit 26 shown in the example in FIGS. 15(A) and 15(B), the robot zero-degree joint power transmission unit 27 shown in the example in FIGS. 17(A) and 17(B), and the robot toe plate 24 shown in the example in FIGS. 13(A), 13(B) and 16(A)–16(D), and a structure of various types of robots ensuring a wide variety of functions and a wide variety of configurations can be completed by appropriately assembling the various types of units from the unit set for robots here.

INDUSTRIAL APPLICABILITY

According to the first aspect of the present invention, the surface profiles of joint units are formed as dice-like cubes or uniaxial cylindrical bodies or orthogonal dual-axis cylinder-like cubes having a uniform joint means separation distance, thereby providing joint units advantageous for the reduction in size due to installation of the components stored in the joint casing at high densities, and also for improved rotational moving functions due to the increased adjacency of the rotating tracks of the joint casing.

According to the second aspect of the present invention, the joint means comprises N positioning projections disposed at equal intervals and equal angles around an axis, and N connecting screw holes disposed at positions rotated by 360°/2N from those of the N positioning projections around the axis, thereby providing a joint unit which is highly convenient in the assembly construction work in virtue of facilitating the assembly of other members to the joint means at various angles.

According to the third aspect of the present invention, a rotating driving means, such as a motor, is made of a plurality of ones cooperatively driving one intermediate gear introduced therebetween, thereby providing a joint unit which is advantageous in the reduction in size of the joint casing due to high-density mounting, from the viewpoint that the multiple driving means divided in small sizes can be dispersed and arrayed at high densities in the joint casing.

According to the fourth aspect of the present invention, a single stay comprises on both ends thereof N fitting holes capable of fitting to the N positioning projections on the joint means at each rotational position of 360°/2N around an axis, as joint receiving means, and also, a double stay comprises on both ends thereof axially supporting receiving means such as axially supporting holes or the like rotatably fitting to axially supporting means such as axially supporting pins disposed facing joint means on the casing surface of the joint unit, thereby providing single stays and double stays which are highly convenient for the assembly construction work of joint units, in virtue of facilitating connecting to the joint units.

According to the fifth aspect of the present invention, an L-shaped stay comprises joint receiving means on both ends thereof, thereby providing an L-shaped stay which is highly convenient in the assembly construction work of joint units, in virtue of facilitating connecting to joint units.

According to the sixth aspect of the present invention, a dual-axial joint power transmission unit converts and transmits the rotations of an input joint rotating shaft connected to the joint means of a joint unit fixed to the casing into those of an output joint rotating shaft disposed at a position distanced from the input joint rotating shaft, thereby providing a dual-axial joint power transmission unit which improves rotational moving functions of joint units from the viewpoint that rolling motions and pitching motions of the joint unit on two orthogonal axes are enabled.

According to the seventh aspect of the present invention, a zero-degree joint power transmission unit converts and transmits the rotations of the joint unit rotating by itself relatively as to an input joint fixed shaft fixed to the casing into those of the output joint rotating shaft disposed at a position distanced by a joint unit separation distance from the input joint fixed shaft, thereby providing a zero-degree joint power transmission unit which improves rotational moving functions of joint units from the viewpoint that a mutual 360° (0°) rotation with regard to a couple of the joint units is enabled.

According to the eighth aspect of the present invention, a unit set for a robot includes the joint unit, the single stay, the double stay, the L-shaped stay, the dual-axis joint power transmission unit, and the zero-degree joint power transmission unit, thereby providing a unit set for robots capable of implementing a wide variety of configurations and a wide variety of functions as a robot structure. Such unit sets for robots have a high industrial utility value.

What is claimed is:

1. A unit set for a robot including a joint unit for a robot, said unit set for a robot comprising:
    a joint casing having a surface profile;
    an output rotating shaft which passes through one of first opposed surfaces of said joint casing to extend to the exterior thereof, and which has a first center axis orthogonal, at arbitrary opposed positions, to said first surfaces of said surface profile as a center axis thereof;
    rotational driving means stored in said joint casing and fixed to said casing;
    reducing means connected to a driving rotating shaft of said rotational driving means, for reducing a speed of rotations of said driving rotating shaft and transmitting the rotations to said output rotating shaft;
    rotating joint means having a center axis in common with the center axis of said output rotating shaft, for rotating as one body together with said output rotating shaft; and
    fixed joint means fixed on one of second opposed surfaces of said joint casing, which fixed joint means has another center axis held in common with a second center axis intersecting, at arbitrary opposed positions, said second surfaces orthogonal to one of said first surfaces where said output rotating shaft extends to the exterior of said joint casing, further intersecting the first center axis held in common with said output rotating shaft, which fixed joint means has the same configuration as said rotating joint means;
    wherein a separation distance for each of the joint means, from an intersection of said first center axis with said second center axis along each of said first and second center axes to each of said joint means, is uniform.

2. The unit set for a robot including a joint unit for a robot, according to claim 1, comprising a joint casing having a cylindrical surface profile, wherein a center axis of said cylinder is common with the center axis of said output rotating shaft.

3. The unit set for a robot including a joint unit for a robot, according to claim 1, comprising a joint casing having a surface profile of an orthogonal dual-axis cylinder-like cube configured of overlapping enclosing portions of two cylindrical parts each having an axis of uniform axial length which forms each of orthogonal dual axes, wherein a center axis of one cylindrical part of said two cylindrical parts is held in common with the center axis of said output rotating shaft, and wherein a center axis of the other cylindrical part is held in common with another center axis which intersects the center axis held in common with said output rotating shaft.

4. A unit set for a robot including a joint unit for a robot, said unit set for a robot comprising:
 a joint casing having a surface profile;
 an output rotating shaft, which passes through one of opposed surfaces of said joint casing to extend to the exterior thereof, and which has one axis orthogonal, at arbitrary opposed positions, to said surfaces as a center axis thereof;
 rotational driving means stored in said joint casing and fixed to said casing;
 reducing means connected to a driving rotating shaft of said rotational driving means, for reducing a speed of rotations of said driving rotating shaft and transmitting the rotations to said output rotating shaft;
 rotating joint means having a first center axis in common with that of said output rotating shaft, and comprising N positioning projections disposed about said output rotating shaft at equal intervals on an arbitrary circumference surrounding said center axis, and N connecting screw holes disposed about said output rotating shaft at positions rotated from said N positioning projections by 360°/2N with regard to said center axis as the center thereof, so as to rotate as one body together with said output rotating shaft;
 fixed joint means having a second center axis which orthogonally intersects, at arbitrary opposed positions, the opposed surfaces orthogonal to the surface of said joint casing where said output rotating shaft extends to the exterior and which further intersects said first center axis, and comprising N positioning projections disposed fixedly on said joint casing at equal intervals on an arbitrary circumference surrounding said second center axis, and N connecting screw holes disposed fixedly on said joint casing at positions rotated from said N positioning projections by 360°/2N with regard to said second center axis as the center thereof.

5. The unit set for a robot including a joint unit for a robot, according to claim 4, wherein said rotating joint means having the first center axis held in common with said output rotating shaft, comprises two positioning projections disposed around said output rotating shaft, and two connecting screw holes disposed around said output rotating shaft in an axially symmetrical manner with regard to said center axis at positions rotated by 90° from said two positioning projections with regard to said center axis as the center thereof;
 and wherein said fixed joint means having the second center axis which orthogonally intersects, at the arbitrary opposed positions, the opposed surfaces orthogonal to the surface of said joint casing where said output rotating shaft extends to the exterior, comprises two positioning projections disposed on said joint casing in an axially symmetrical manner with regard to said center axis, and two connecting screw holes disposed on said joint casing at positions rotated by 90° from said two positioning projections with regard to said center axis as the center thereof.

6. A unit set for a robot including a joint unit for a robot, said unit set for a robot comprising:
 a joint casing having a surface profile;
 an output rotating shaft, which passes through one of the opposed surfaces of said joint casing to extend to the exterior thereof, and which has one axis orthogonal, at the arbitrary opposed positions, to said surfaces as a center axis thereof;
 rotational driving means stored in said joint casing and fixed to said casing;
 reducing means which are connected to a driving rotating shaft of said rotational driving means, for reducing a speed of the rotations of said driving rotating shaft and transmitting said rotations to said output rotating shaft;
 rotating joint means having a first center axis in common with the center axis of said output rotating shaft, and comprising N positioning projections disposed about said output rotating shaft at equal intervals on an arbitrary circumference surrounding said center axis, and N connecting screw holes disposed about said output rotating shaft at positions rotated from said N positioning projections by 360°/2N with regard to said center axis as the center thereof, so as to rotate as one body together with said output rotating shaft;
 fixed joint means having a second center axis which orthogonally intersects, at the arbitrary opposed positions the opposed surfaces orthogonal to the surface of said joint casing where said output rotating shaft extends to the exterior and which further intersects said first center axis, and comprising N positioning projections disposed on said joint casing at equal intervals on an arbitrary circumference surrounding said second center axis, and N connecting screw holes disposed on said joint casing at positions rotated from said positioning projections by 360°/2N with regard to said second center axis as the center thereof;
 wherein the separation distance for each of the joint means, from an intersection of said first center axis with said second center axis along each of said first and second center axes to each of said joint means, is uniform.

7. The unit set for a robot including a joint unit for a robot, according to claim 6,
 wherein said rotating joint means having the first center axis held in common with said output rotating shaft comprises two positioning projections disposed around said output rotating shaft in an axially symmetrical manner with regard to said center axis, and two connecting screw holes disposed around said output rotating shaft at positions rotated by 90° from said two positioning projections with regard to said center axis as the center thereof; and
 wherein said fixed joint means having the second center axis which orthogonally intersects, at the arbitrary opposed positions, the opposed surfaces orthogonal to the surface of said joint casing where said output rotating shaft extends to the exterior, comprises two positioning projections disposed on said joint casing in an axially symmetrical manner with regard to said center axis, and two connecting screw holes disposed on said joint casing at positions rotated by 90° from said two positioning projections with regard to said center axis as the center thereof.

8. The unit set for a robot including a joint unit for a robot, according to claim 6, comprising a joint casing having a cylindrical surface profile, wherein the center axis of said cylinder is common with the center axis of said output rotating shaft.

9. The unit set for a robot including a joint unit for a robot, according to claim 6, comprising a joint casing having a surface profile of an orthogonal dual-axis cylinder-like cube configured of overlapping enclosing portions of two cylindrical parts each having an axis of uniform axial length which forms each of orthogonal dual axes, wherein a center axis of one cylindrical part of said two cylindrical parts is held in common with the center axis of said output rotating shaft, and wherein a center axis of the other cylindrical part is held in common with another center axis which intersects the center axis held in common with said output rotating shaft.

10. A unit set for a robot including a joint unit for a robot, said unit set for a robot comprising:
    a joint casing having a surface profile;
    an output rotating shaft which passes through one of first opposed surfaces of said joint casing to extend to the exterior thereof, and which has a center axis orthogonal, at the arbitrary opposed positions, to said first surfaces of said surface profile as a center axis thereof;
    two or more rotational driving means stored in said joint casing, and assembled to said joint casing in an attitude for a plurality of driving rotating shafts to stand parallel to said output rotating shaft, at an inner periphery portion centered on said output rotating shaft;
    reducing means comprising a plurality of reducing gear trains disposed about said output rotating shaft so as to link the respective driving gears on said driving rotating shafts of said two or more rotating driving means to a slave gear on said output rotating shaft, thereby reducing a speed of rotations of said driving rotating shafts and transmitting said rotations to said output rotation shaft;
    rotating joint means having a center axis in common with that of said output rotating shaft, for rotating as one body together with said output rotating shaft; and
    fixed joint means fixed on one of second opposed surfaces of said joint casing, which fixed joint means has another center axis held in common with a second center axis intersecting, at arbitrary opposed positions, said second surfaces orthogonal to one of said first surfaces where said output rotating shaft extends to the exterior of said joint casing, further intersecting the first center axis held in common with said output rotating shaft, which fixed joint means has the same configuration as said rotating joint means;
    wherein the separation distance for each of the joint means, from an intersection of said first center axis with said second center axis along each of said first and second center axes to each of said joint means, is uniform.

11. The unit set for a robot including a joint unit for a robot, according to claim 10, wherein said reducing means comprises an intermediate gear, a single tooth row of which meshes with all of the driving gears provided on the respective driving rotating shafts of one or more driving means to rotate around a center axis aligned with the center axis of the output rotating shaft, whereby the rotations of said driving gears are transmitted to the reducing gear trains.

12. The unit set for a robot including a joint unit for a robot, according claim 10, comprising a joint casing having a cylindrical surface profile, wherein the center axis of said cylinder is common with the center axis of said output rotating shaft.

13. The unit set for a robot including a joint unit for a robot, according to claim 10, comprising a joint casing having a surface profile of an orthogonal dual-axis cylinder-like cube configured of overlapping enclosing portions of two cylindrical parts each having an axis of uniform axial length which forms each of orthogonal dual axes, wherein a center axis of one cylindrical part of said two cylindrical parts is held in common with the center axis of said output rotating shaft, and wherein a center axis of the other cylindrical part is held in common with another center axis which intersects the center axis held in common with said output rotating shaft.

14. The unit set for a robot including a joint unit for a robot, according to claim 1, comprising a joint casing further including robot joint unit fixing means fixed on one surface of said joint casing through which said output rotating shaft passes to extend to the exterior thereof.

15. The unit set for a robot including a joint unit for a robot, according to claim 1, further comprising:
    double-use stay axial-supporting means for a fixed joint, fixed on said joint casing so as to face outwards therefrom, at a position on the surface thereof where the center axis of said rotating joint means passes through a surface of said joint casing confronting the surface of said joint casing wherein said rotating joint means is arranged; and
    double-use stay axial-supporting means for a double-use rotating joint, fixed on said joint casing so as to face outwards therefrom, at a position on the surface thereof where the center axis of said fixed joint means passes through a surface of said joint casing confronting the surface of said joint casing wherein said fixed joint means is arranged.

16. A unit set for a robot including a single stay for a robot, said unit set for a robot comprising a long plate-shaped rigid member, having on both ends thereof joint receiving means for detachably connecting to said rotating joint means or said fixed joint means on said joint unit for a robot;
    wherein said joint receiving means comprises 2N fitting holes which align with and fit to the respective N positioning projections on said rotating joint means or said fixed joint means, 2N fitting holes for aligning and fitting at each position rotated by 360°/2N around the center axis of said rotating joint means or the center axis of said fixed joint means as the center thereof, and wherein N fitting holes other than the N fitting holes aligned with and fitted to said N positioning projections are aligned with N connecting screw holes of said rotating joint means or said fixed joint means, and arranged so as to allow the single stay to be fastened by screwing a bolt at least into one fitting hole.

17. A unit set for a robot including an L-shaped stay for a robot, said unit set for a robot comprising a long L-shaped rigid member having on both ends thereof said joint receiving means for detachably connecting to said rotating joint means or said fixed joint means on said joint unit for a robot;
    wherein said joint receiving means comprises 2N fitting holes which align with and fit to the respective N positioning projections on said rotating joint means or said fixed joint means, 2N fitting holes for aligning and fitting at each position rotated by 360°/2N around the center axis of said rotating joint means or the center axis of said fixed joint means as the center thereof, and wherein N fitting holes other than the N fitting holes aligned with and fitted to said N positioning projections are aligned with N connecting screw holes of said rotating joint means or said fixed joint means, and arranged so as to allow the single stay to be fastened by screwing a bolt at least into one fitting hole.

18. A unit set for a robot including a dual-axis joint power transmission unit for a robot, said unit set for a robot comprising:
- a long plate-shaped cubic casing for a dual-axis joint power transmission unit;
- an input joint rotating shaft rotatably supported and stored in said dual-axis joint power transmission unit casing, passing through the surface of one end portion of said casing to extend outwards;
- input joint rotating shaft connecting means provided on said input joint rotating shaft, for detachably connecting to rotating joint means of one joint unit for a robot;
- an output joint rotating shaft rotatably supported and stored in said dual-axis joint power transmission unit casing, passing through the surface of the other end portion of said casing to extend outwards, at a position a predetermined joint unit separation distance in the longitudinal direction of said casing from said input rotating shaft;
- output joint rotating shaft connecting means provided on said output joint rotating shaft, for detachably connecting to fixed joint means of an other joint unit for a robot; and
- joint rotation converting means lying in said casing between said input joint rotating shaft and said output joint rotating shaft, for converting rotations of said input joint rotating shaft into rotations at a predetermined rotating speed and in a predetermined rotating direction, and transmitting the rotations to said output joint rotating shaft;
- wherein a joint unit fixing receiving means, for fixing the one joint unit for a robot to a dual-axis joint power transmission unit by connecting to said joint unit fixing means of said one joint unit for a robot in which rotating joint means are connected to said input joint rotating shaft connecting means, is provided on one surface of the casing for said dual-axis joint power transmission unit through which said input joint rotating shaft passes through to extend outwards.

19. The unit set for a robot including a dual-axis joint power transmission unit for a robot, according to claim 18, wherein the predetermined joint unit separation distance is twice the joint means separation distance of said joint unit for a robot.

20. The unit set for a robot including a dual-axis joint power transmission unit for a robot, according to claim 18, wherein said joint rotation converting means converts the rotations of said input joint rotating shaft into rotations at the same speed and in the same direction, and transmit the rotations to said output joint rotating shaft.

21. A unit set for a robot including a zero-degree joint unit for a robot, said unit set for a robot comprising:
- a long plate-shaped cubic casing for a zero-degree joint power transmission unit;
- input joint fixed shaft connecting means for detachably connecting to rotating joint means of a joint unit for a robot, provided on an input joint fixed shaft fixed on the surface of one end of the casing for said zero-degree joint power transmission unit;
- joint casing connecting means for detachably connecting an annular driving gear having external teeth to joint unit fixing means to allow said annular driving gear to be inserted rotatably into said input joint fixed shaft;
- an output joint rotating shaft rotatably supported and stored in said zero-degree joint power transmission unit casing, passing through the surface of the other end portion of said casing to extend outwards, at a position a predetermined joint unit separation distance in the longitudinal direction of said casing from said input joint fixed shaft;
- output joint rotating shaft connecting means provided on said output joint rotating shaft, for detachably connecting to fixed joint means of said of an other joint unit for a robot; and
- joint rotation inversion converting means stored in said zero-degree joint power transmission unit casing lying between said joint casing connecting means and said output joint rotating shaft, for converting rotations of said annular driving gear of said joint casing connecting means into rotations at a predetermined speed and in a predetermined direction and transmitting rotations to said output joint rotating shaft.

22. The unit set for a robot including a zero-degree joint unit for a robot, according to claim 21, wherein the predetermined joint means separation distance is twice the joint unit separation distance of said joint unit for a robot.

* * * * *